US009774932B2

(12) United States Patent
Yang et al.

(10) Patent No.: US 9,774,932 B2
(45) Date of Patent: Sep. 26, 2017

(54) METHOD AND APPARATUS FOR DATA PACKET SWITCHING, ACCESS SWITCH AND SWITCHING SYSTEM

(71) Applicant: Huawei Technologies Co., Ltd., Shenzhen (CN)

(72) Inventors: Xiaoling Yang, Shenzhen (CN); Huixiao Ma, Shenzhen (CN); Dongyu Geng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/981,367

(22) Filed: Dec. 28, 2015

(65) Prior Publication Data

US 2016/0134954 A1     May 12, 2016

Related U.S. Application Data

(63) Continuation of application No. PCT/CN2014/072446, filed on Feb. 24, 2014.

(30) Foreign Application Priority Data

Jun. 28, 2013   (CN) .......................... 2013 1 0269682

(51) Int. Cl.
    *H04Q 11/00*       (2006.01)
    *H04L 12/46*       (2006.01)
            (Continued)

(52) U.S. Cl.
    CPC ....... *H04Q 11/0071* (2013.01); *H04L 12/462* (2013.01); *H04L 12/4625* (2013.01); *H04L 12/6418* (2013.01); *H04Q 11/0003* (2013.01);

*H04L 45/66* (2013.01); *H04L 45/745* (2013.01); *H04L 49/201* (2013.01);
(Continued)

(58) Field of Classification Search
None
See application file for complete search history.

(56) References Cited

U.S. PATENT DOCUMENTS

2008/0240100 A1    10/2008   Smith et al.

FOREIGN PATENT DOCUMENTS

| CL | 101447915 A | 6/2009 |
|---|---|---|
| CN | 101098286 A | 1/2008 |

(Continued)

*Primary Examiner* — Darren E Wolf
(74) *Attorney, Agent, or Firm* — Leydig, Voit & Mayer, Ltd.

(57) ABSTRACT

The present invention provides a method and an apparatus for data packet switching, and an access switch and a switching system, so as to satisfy requirements of a datacenter for a switching bandwidth and a switching granularity. The method includes: receiving MAC frame control information; determining an interface used for forwarding an MAC frame according to the MAC frame control information and through performing a query on a MAC address forwarding table, where the interface used for forwarding the MAC frame includes a downlink interface, an uplink electrical packet switching network interface and/or an uplink optical packet switching network interface; transmitting a control signal to an electrical packet switching unit, so that the MAC frame is forwarded to the determined interface. According to the method provided in the present invention, the utilization rate of each interface can be improved.

15 Claims, 14 Drawing Sheets

(51) Int. Cl.
 *H04L 12/64* (2006.01)
 *H04L 12/741* (2013.01)
 *H04L 12/721* (2013.01)
 *H04L 12/931* (2013.01)

(52) U.S. Cl.
 CPC ............... *H04Q 2011/0047* (2013.01); *H04Q 2011/0064* (2013.01); *H04Q 2011/0073* (2013.01)

(56) References Cited

FOREIGN PATENT DOCUMENTS

| | | |
|---|---|---|
| CN | 101883050 A | 11/2010 |
| CN | 103152271 A | 6/2013 |
| CN | 103179037 A | 6/2013 |

METHOD AND APPARATUS FOR DATA PACKET SWITCHING, ACCESS SWITCH AND SWITCHING SYSTEM

CROSS-REFERENCE TO RELATED APPLICATIONS

This application is a continuation of International Patent Application No. PCT/CN2014/072446, filed on Feb. 24, 2014, which claims priority to Chinese Patent Application No. 201310269682.1, filed on Jun. 28, 2013, both of which are hereby incorporated by reference in their entireties.

TECHNICAL FIELD

The present invention relates to the field of communication technologies and, in particular, to a method and an apparatus for data packet switching, an access switch and a switching system.

BACKGROUND

A datacenter (data center/datacenter), which is also called a server farm, is used for placing a computer system and its relevant communication components such as a backup power supply device, a redundant data communication connection and a device relating to environment control and security, and is an important infrastructure for enterprise informatization. The datacenter is a center for providing, by the enterprise, application business service relevant to all kinds of information, it is also the center for data computing, switching and storing. The datacenter, which combines advanced computing modes, network techniques and storing techniques, provides a platform for running information service of the enterprise. The datacenter in prior art usually consists of servers, TOR (Top Of Rack) switches, aggregation layer switches and a core layer switch and etc., which are organized in a three-level tree structure shown in FIG. 1, where the servers act as leaf nodes in the tree structure and connect to the TOR switches via 1 Gbps network interfaces, the TOR switches, the aggregation layer switches and the core layer switches respectively act as the nodes of the tree, each of the TOR switches connects to the aggregation layer switch via an interface with a higher rate, such as 10 Gbps, each of the aggregation layer switches further connects to the core layer switch via an interface with a higher rate, such as 40 Gbps, thus, the closer a switch approaches the root node, the more switching capacity the switch needs to provide so as to meet the demand.

With the development of novel applications such as video streaming, social network and cloud computing and etc., requirements for the datacenter are becoming higher and higher, for example, application programs managed on the servers of the datacenter (such as cloud computing applications, search engines and etc.) need to exchange mass data among the servers of the datacenter. Thus, an efficient interconnect solution needs to be designed in the network constituted by datacenters, so as to provide a higher bandwidth and a lower delay, however, the limitations of technologies, such as the backplane technology and the energy consumption technology, make the electrical switching technology cannot met the bandwidth and the delay required by the datacenter.

In order to solve the aforementioned problem, a network architecture for the datacenter, which is a C-through architecture as shown in FIG. 2, is proposed in the prior art, the C-through architecture is a datacenter network with a hybrid network structure formed by mixing the optical circuit switching and the electrical packet switching. In the C-through architecture illustrated in FIG. 2, the datacenter is constituted by an electrical network and an optical network. The electrical network provides a network in which servers are full interconnected, the architecture of the electrical network, which is consistent with the architecture in prior data, is a three-level tree structure including TOR switches, aggregation layer switches and a core layer switch. The optical network is constituted by a configurable optical circuit switching device, and can provide an optical link between two racks, so that the two racks can communicate with each other at a very high rate.

When a long data stream transmission takes place between two TOR switches, such as a communication connection lasting for 1 s, the central controller configures an optical circuit connection with a high rate and a wide bandwidth for this pair of TOR switches, the two TOR switches then communicates through the optical network, and for other TOR switches, if only small amount of data transmission takes place, then the other TOR switches still communicates through the electrical network. In this way, the optical network takes over the switching of the long data streams, while the electrical network takes over the switching of the short data streams.

In the datacenter network according to the prior art, the configurable optical circuit switching device is primarily responsible for the switching of the long data streams, when the long data streams such as data backup are the main part of the data streams in the network, the optical circuit switching can provide efficient service, however, when the short data streams such as social services are the main part of the data streams in the network, the optical circuit switching plays a small role.

SUMMARY

The present invention provides a method and an apparatus for data packet switching, and an access switch and a switching system, so as to satisfy requirements of a datacenter for a switching bandwidth and a switching granularity.

An embodiment of the present invention provides a method for data packet switching, where the method includes: receiving Media Access Control Address (MAC) frame control information, where the MAC frame control information includes one or any combination of a destination MAC address, a virtual local area network identifier and frame protocol type information;

determining an interface used for forwarding an MAC frame according to the MAC frame control information and through performing a query on a MAC address forwarding table, where the interface used for forwarding the MAC frame includes a downlink interface, an uplink electrical packet switching network interface and/or an uplink optical packet switching network interface; and transmitting a control signal to an electrical packet switching unit, so that the MAC frame is forwarded to the determined interface.

Another embodiment of the present invention provides a method for data packet switching, where the method includes:

extracting Media Access Control Address (MAC) frame control information from a received MAC frame, and establishing a MAC address forwarding table according to the MAC frame control information, where the MAC frame control information includes one or any combination of a source MAC address, a destination MAC address, a virtual local area network identification and frame protocol type information;

receiving the MAC frame control information, determining an interface used for forwarding an MAC frame according to the MAC frame control information and through performing a query on a MAC address forwarding table, transmitting a control signal to an electrical packet switching unit, where the interface used for forwarding the MAC frame includes a downlink interface, an uplink electrical packet switching network interface and/or an uplink optical packet switching network interface; and forwarding, by the electrical packet switching unit, the MAC frame to the determined interface.

An embodiment of the present invention provides an apparatus for data packet switching, where the apparatus includes: a receiving module, configured to receive Media Access Control Address (MAC) frame control information, where the MAC frame control information includes one or any combination of a destination MAC address, a virtual local area network identifier and frame protocol type information;

a determining module, configured to determine an interface used for forwarding an MAC frame according to the MAC frame control information and through performing a query on a MAC address forwarding table, where the interface used for forwarding the MAC frame includes a downlink interface, an uplink electrical packet switching network interface and/or an uplink optical packet switching network interface; and a signal transmitting module, configured to transmit a control signal to an electrical packet switching unit, so that the MAC frame is forwarded to the determined interface.

An embodiment of the present invention provides an access switch, where the access switch includes: a transceiving module, includes a first Ethernet transceiving unit, a second Ethernet transceiving unit and an optical packet transceiving unit, where the transceiving module is configured to extract Media Access Control Address (MAC) frame control information from a received MAC frame, and establish a MAC address forwarding table according to the control information, where the MAC frame control information includes one or any combination of a source MAC address, a destination MAC address, a virtual local area network identifier and frame protocol type information;

a controller connecting to the transceiving module, configured to receive the MAC frame control information, determine an interface used for forwarding an MAC frame according to the MAC frame control information and through performing a query on a MAC address forwarding table, and transmit a control signal to an electrical packet switching unit, where the interface used for forwarding the MAC frame includes a downlink interface, an uplink electrical packet switching network interface and/or an uplink optical packet switching network interface; and an electrical packet switching unit connecting to the controller, configured to forward the MAC frame to the determined interface.

An embodiment of the present invention provides a data packet switching system, where the data packet switching system includes: a core layer electrical packet switching device, a core layer optical packet switching device and at least one access system, where the access system includes a server group consisting of at least one server, and an access switch connecting to the server group, where the access switch connects to the server group via a downlink interface, and connects to the core layer electrical packet switching device via an uplink electrical packet switching network interface, and connects to the core layer optical packet switching device via an uplink optical packet switching network interface;

the access switch is configured to receive a Media Access Control Address (MAC) frame, extract MAC frame control information and establish a MAC address forwarding table according to the MAC frame control information, where the MAC frame control information includes one or any combination of a source MAC address, a destination MAC address, a virtual local area network identifier and frame protocol type information;

the access switch receives the MAC frame from the server group via the downlink interface, extracts MAC frame control information, determines an interface used for forwarding the MAC frame according to the MAC frame control information and through performing a query on the MAC address forwarding table, and transmits a control signal to an electrical packet switching unit, to forward the MAC frame to the server group via the determined interface, the core layer electrical packet switching device and/or the core layer optical packet switching device; or, the access switch receives the MAC frame from the core layer electrical packet switching device via the uplink electrical packet switching network interface, extracts MAC frame control information, determines an interface used for forwarding the MAC frame according to the MAC frame control information and through performing a query on the MAC address forwarding table, and transmits a control signal to an electrical packet switching unit, to forward the MAC frame to the server group via the determined interface; or, the access switch receives an optical packet from the core layer optical packet switching device via the uplink optical packet switching network interface, extracts MAC frame control information, determines an interface used for forwarding the MAC frame according to the MAC frame control information through performing a query on the MAC address forwarding table, and transmits a control signal to an electrical packet switching unit, to forward the MAC frame to the server group via the determined interface.

It can be seen from the aforementioned embodiments of the present invention that, since the interface used for switching the MAC frame includes the downlink interface, the uplink electrical packet switching network interface and/or the uplink optical packet switching network interface, the MAC frame may be switched to the electrical packet network and/or the optical packet switching network via any one or more of the aforementioned interfaces, and arrives at a destination device through the server, the core layer electrical packet switching device and/or the core layer optical packet switching device therein. Comparing with the prior art, the method provided in the present invention comprehensively takes a forwarding mechanism into account and combines with the feature of traffic in the data center, thereby optimally designing respective bandwidths of three interfaces in the access switch, including a downlink interface, an uplink electrical packet switching network interface and an uplink optical packet switching network interface, thus the utilization rate of each interface can be improved.

BRIEF DESCRIPTION OF DRAWINGS

To describe the technical solutions in embodiments of the present invention more clearly, the following briefly introduces the accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present invention also fall within the protection scope of the present invention.

Figure 1:
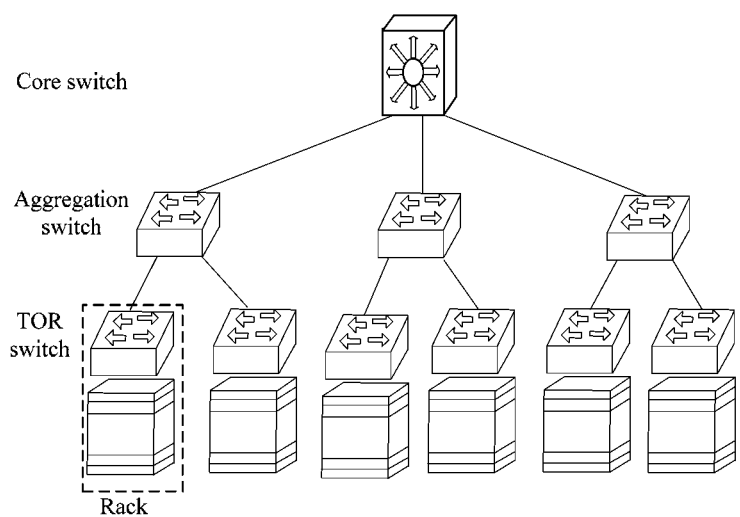
FIG. 1 is a schematic diagram of a datacenter network organized in a three-level tree structure according to the prior art.
Figure 2:
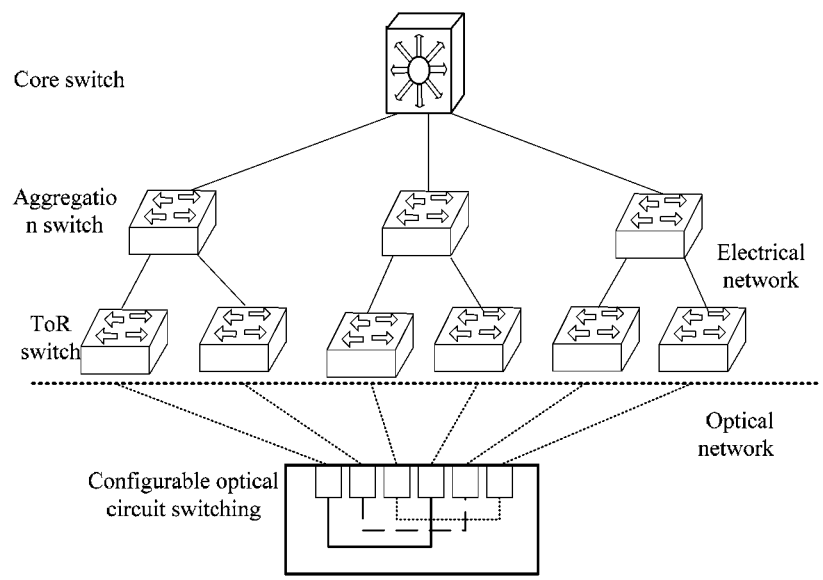
FIG. 2 is a schematic diagram of a datacenter network organized in a C-through architecture according to the prior art.
Figure 3:
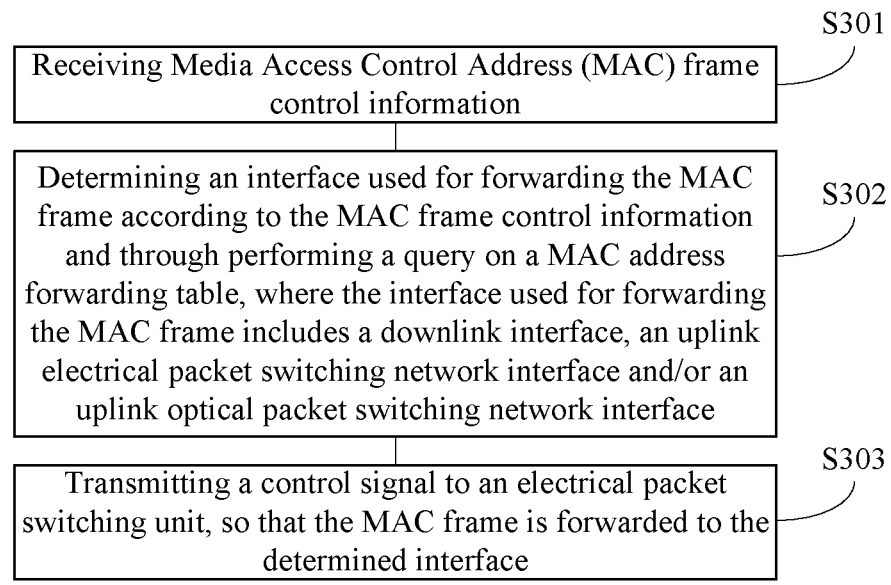
FIG. 3 is a schematic flowchart of a method for data packet switching according to an embodiment of the present invention.

Please refer to FIG. 3, which is a schematic flowchart of a method for data packet switching according to an embodiment of the present invention, where the entity executing the method may be a controller in an access switch provided in embodiments of the present invention or a functional module/unit in the controller. The method for data packet switching illustrated in FIG. 3 mainly includes step S301, step S302 and step S303, which are described in detail as follows:

S301, receiving Media Access Control Address (MAC) frame control information.

In the embodiment of the present invention, the MAC frame control information includes any one of a destination MAC address, a virtual local area network identifier and frame protocol type information, or any combination thereof, for example, may be a combination of the destination MAC address, the virtual local area network (V-LAN) identifier and the frame protocol type information. After receiving a MAC frame, an Ethernet packet transceiving unit or an optical packet transceiving unit in the access switch provided in embodiments of the present invention extracts the MAC frame control information from the MAC frame, and transmits the MAC frame control information to the controller.

S302, determining an interface used for forwarding the MAC frame according to the MAC frame control information and through performing a query on a MAC address forwarding table, where the interface used for forwarding the MAC frame includes a downlink interface, an uplink electrical packet switching network interface and/or an uplink optical packet switching network interface.

Different from the prior art, in the embodiment of the present invention, the interface used for forwarding the MAC frame is not limited to the downlink interface, the uplink electrical packet switching network interface or the uplink optical packet switching network interface, but includes the combination of the aforementioned interfaces, for example, the interface used for forwarding the MAC frame includes the downlink interface, the uplink electrical packet switching network interface and/or the uplink optical packet switching network interface, and may be a combination of the downlink interface, the uplink electrical packet switching network interface and the uplink optical packet switching network interface.

It should be noted that, in the embodiment of the present invention, the MAC address forwarding table is established after the Ethernet packet transceiving unit and the optical packet transceiving unit in the access switch restore the MAC frame from received data and perform a MAC address learning according to a source MAC address and a VLAN ID carried in the MAC frame, the structure of the MAC address forwarding table is shown in Table 1:

TABLE 1

| MAC address | VLAN ID | Optical packet switching network forwarding interface information | Electrical packet switching network forwarding interface information | Other information |
|---|---|---|---|---|
| 00e0-fc09-bcf9 | 1 | NULL | Downlink interface 1 | . . . |

TABLE 1-continued

| MAC address | VLAN ID | Optical packet switching network forwarding interface information | Electrical packet switching network forwarding interface information | Other information |
|---|---|---|---|---|
| 000e-0c6f-6e82 | 1 | Uplink optical packet switching network interface 1 | Uplink electrical packet switching network interface 2 | ... |
| 00e0-fe09-f9ba | 2 | Uplink optical packet switching network interface 2 | NULL | ... |
| 00e0-fe09-baf9 | 2 | NULL | Uplink electrical packet switching network interface 3 | ... |
| . | . | . | . | . |
| . | . | . | . | . |
| . | . | . | . | . |

The MAC address forwarding table illustrated in Table 1, in which the table entries mainly include the MAC address, the VLAN ID, the optical packet switching network forwarding interface information, the electrical packet switching network forwarding interface information and other information, where, the VLAN ID refers to the VLAN ID to which the MAC address in the corresponding table entry belongs, the optical packet switching network forwarding interface information designates an outlet via which a MAC frame is forwarded to an optical packet switching network, where the MAC frame carries a destination MAC address that is consistent with the corresponding MAC address in the table entries; the electrical packet switching network forwarding interface information designates an outlet via which a MAC frame is forwarded to an electrical packet switching network, where the MAC frame carries a destination MAC address that is consistent with the corresponding MAC address in the table entries, where the electrical packet switching network includes a network constituted by a server group and a network constituted by an electrical packet switching device. For example, when the destination MAC address of a certain MAC frame is 000e-0c6f-6e82, perform a query on the MAC address forwarding table illustrated in Table 1, 000e-0c6f-6e82 can be found in the MAC address column of the MAC address forwarding table illustrated in Table 1, and the optical packet switching network forwarding interface information and the electrical packet switching network forwarding interface information corresponding to 000e-0c6f-6e82 are, respectively, the uplink optical packet switching network interface 1 and the uplink electrical packet switching network interface 2, which means that said MAC frame may be forwarded to the uplink optical packet switching network interface 1, and may also be forwarded to the uplink electrical packet switching network interface 2, and the controller will decide, by running a certain switching mechanism, the interface to which said MAC frame is finally forwarded. In the MAC address forwarding table, if the optical packet switching network forwarding interface information or the electrical packet switching network forwarding interface information is null, i.e. NULL, it means that said MAC address has not yet been learned from the corresponding network at the present moment. For example, in the MAC address forwarding table illustrated in Table 1, the optical packet switching network forwarding interface information corresponding to the MAC address table entry 00e0-fc09-bcf9 is NULL, it means that the MAC address 00e0-fc09-bcf9 has not yet been learned from the uplink optical packet switching network interface at present; the "other information" in Table 1 mainly refers to ageing time of the MAC address and status information indicating whether said MAC address is obtained through learning or statically configured. The ageing time of the MAC address refers to that, in a regulated time interval, if none of the interfaces on the access switch receives a data packet of which the source MAC address is the corresponding MAC address, then information of the MAC address in the MAC address forwarding table will be deleted, however, forwarding information of the MAC address that is normally statically configured would not be affected by the ageing time.

S303, transmitting a control signal to an electrical packet switching unit, so that the MAC frame is forwarded to the determined interface.

As an embodiment of determining the interface used for forwarding the MAC frame according to the MAC frame control information and through performing a query on the MAC address forwarding table, it may be: if the MAC frame is from a downlink interface, and the destination MAC address of the MAC frame is not a broadcast address or a multicast address, and it is found that a table entry corresponding to the destination MAC address of the MAC frame exists in the MAC address forwarding table, and optical packet switching network forwarding interface information in the MAC address forwarding table is not NULL, and it is judged that the MAC frame is not a protocol frame according to the control information, and output cache which corresponds to the uplink optical packet switching network interface corresponding to the destination MAC address of the MAC frame is not overflowed, then determine the uplink optical packet switching network interface corresponding to the destination MAC address of the MAC frame to be used for forwarding the MAC frame. For example, a MAC frame of which the destination MAC address is 000e-0c6f-6e82 is received from a certain downlink interface, the MAC frame satisfies the aforementioned conditions in the embodiment, according to Table 1, this MAC frame is determined to be forwarded to the uplink optical packet switching network interface 1 designated by the optical packet switching network forwarding interface information corresponding to the MAC address 000e-0c6f-6e82. If the uplink optical packet switching network interface corresponding to the destination MAC address of the MAC frame is determined to be used for switching the MAC frame, correspondingly, the transmitting the control signal to the electrical packet switching unit, so that the MAC frame is forwarded to the determined interface includes: transmitting the control signal to the electrical packet switching unit, so that the MAC frame is forwarded to the uplink optical packet switching network interface corresponding to the destination MAC address of the MAC frame, for example, according to the aforementioned exemplary MAC frame of which the destination MAC address is 000e-0c6f-6e82, the MAC frame is forwarded to the uplink optical packet switching network interface 1 designated by the optical packet switching network forwarding interface information corresponding to the MAC address 000e-0c6f-6e82. In the embodiment, if the MAC frame is none of a protocol frame, a broadcast frame or a multicast frame, namely, if the MAC frame is a data frame, then the MAC frame is preferentially forwarded to the uplink optical packet switching network interface, and arrives at the destination through the optical packet switching network, thereby making full use of the advantage of the optical switching, that is, the switching capacity is large, and improving the forwarding or switching efficiency of long data streams.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding address, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then the determining the downlink interface and/or the uplink electrical packet switching network interface used for forwarding the MAC frame may be: if the destination MAC address of the MAC frame is a broadcast address or a multicast address, or the table entry corresponding to the destination MAC address of the MAC frame is not found in the MAC address forwarding address, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding address, then determining the downlink interface and/or the uplink electrical packet switching network interface of the present broadcast domain to be used for broadcasting the MAC frame. If the downlink interface and/or the uplink electrical packet switching network interface of the present broadcast domain is determined to be used for broadcasting the MAC frame, correspondingly, the transmitting the control signal to the electrical packet switching unit, so that the MAC frame is forwarded to the determined interface includes: transmitting the control signal to the electrical packet switching unit, so that the MAC frame is broadcasted to the downlink interface and/or the uplink electrical packet switching network interface of the present broadcast domain. It should be noted that, the method for determining the present broadcast domain in the embodiment of the present invention is similar to the method adopted by the Ethernet switch in the prior art, for example, MAC addresses with the same VLAN ID belong to the same broadcast domain. For the aforementioned embodiment, namely, if the destination MAC address of the MAC frame is a broadcast address or a multicast address, or the table entry corresponding to the destination MAC address of the MAC frame is not found in the MAC address forwarding table, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, if the MAC frame is not from a downlink interface, the determining the downlink interface and/or the uplink electrical packet switching network interface of the present broadcast domain to be used for forwarding the MAC frame may be: if the MAC frame is not from a downlink interface and the destination MAC address of the MAC frame is a broadcast address or a multicast address, or if the MAC frame is not from a downlink interface, and the destination MAC address of the MAC frame is not a broadcast address or a multicast address, and the electrical packet switching network forwarding interface information corresponding to the destination MAC address of the MAC frame is not found in the MAC address forwarding table, then determining the downlink interface of the present broadcast domain to be used for broadcasting the MAC frame. Correspondingly, if the downlink interface of the present broadcast domain is determined to be used for broadcasting the MAC frame, the transmitting the control signal to the electrical packet switching unit, so that the MAC frame is forwarded to the determined interface may be: transmitting the control signal to the electrical packet switching unit, so that the MAC frame is broadcasted to the downlink interface of the present broadcast domain.

For the aforementioned embodiment, namely, if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, if the destination MAC address of the MAC frame is a broadcast address or a multicast address, then the determining the downlink interface and/or the uplink electrical packet switching network interface of the present broadcast domain to be used for forwarding the MAC frame may be: if the MAC frame is from a downlink interface and the destination MAC address of the MAC frame is a broadcast address or a multicast address, then determining the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, the transmitting the control signal to the electrical packet switching unit, so that the MAC frame is forwarded to the determined interface may be: transmitting the control signal to the electrical packet switching unit, so that the MAC frame is broadcasted to the downlink interface and the uplink electrical packet switching network interface of the present broadcast domain.

For the aforementioned embodiment, namely, if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, if the table entry corresponding to the destination MAC address of the MAC frame is not found in the MAC address forwarding table, the determining the downlink interface and/or the uplink electrical packet switching network interface of the present broadcast domain to be used for forwarding the MAC frame may be: if the MAC frame is from a downlink interface, and the destination MAC address of the MAC frame is not a broadcast address or a multicast address, and the table entry corresponding to the destination MAC address of the MAC frame is not found in the MAC address forwarding table, then determining the downlink interface and the uplink electrical packet switching network interface of the present broadcast domain to be used for broadcasting the MAC frame. If the downlink interface and the uplink electrical packet switching network interface of the present broadcast domain are determined to be used for broadcasting the MAC frame, then the transmitting the control signal to the electrical packet switching unit, so that the MAC frame is forwarded to the determined interface may be: transmitting the control signal to the electrical packet switching unit, so that the MAC frame is broadcasted to the downlink interface and the uplink electrical packet switching network interface of the present broadcast domain.

For the aforementioned embodiment, namely, if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, the electrical packet switching network forwarding interface information corresponding to the destination MAC address of the MAC frame in the MAC address forwarding table is NULL, the determining the downlink interface and/or the uplink electrical packet switching network interface of the present broadcast domain to be used for forwarding the MAC frame may be: if the MAC frame is from a downlink interface, and the destination MAC address of the MAC frame is not a broadcast address or a multicast address, and the table entry corresponding to the destination MAC address of the MAC frame is found in the MAC address forwarding table, and optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determining the uplink electrical packet switching network interface of the present broadcast domain to be used for broadcasting the MAC frame. If the uplink electrical packet switching network interface of the present broadcast domain is determined to be used for broadcasting the MAC frame, the transmitted the control signal to the electrical packet switching unit, so that the MAC frame is forwarded to the determined interface may be: transmitting the control signal to the electrical packet switching unit, so that the MAC frame is broadcasted to the uplink electrical packet switching network interface of the present broadcast domain.

It should be noted that, since when the electrical packet switching network forwarding interface information corresponding to the destination MAC address of the MAC frame in the MAC address forwarding table is NULL, and the output cache which corresponds to the uplink optical packet switching network interface corresponding to the destination MAC address of the MAC frame is overflowed, no matter whether the MAC frame is a protocol frame or not, always determining the uplink electrical packet switching network interface of the present broadcast domain to be used for broadcasting the MAC frame, thus, for the aforementioned embodiment, namely, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then the determining the uplink electrical packet switching network interface of the present broadcast domain to be used for broadcasting the MAC frame actually contains two situations, which are: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame; the other situation is that, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is not from a downlink interface, and the destination MAC address of the MAC frame is not a broadcast address or a multicast address, and electrical packet switching network forwarding interface information corresponding to the destination MAC address of the MAC frame is found in the MAC address forwarding table, then determine the downlink interface corresponding to the destination MAC address of the MAC frame to be used for switching the MAC frame. For example, a MAC frame of which the destination MAC address is 00e0-fc09-bcf9 is received from a certain uplink electrical packet switching network interface or a certain uplink optical packet switching network interface, the MAC frame satisfies the aforementioned conditions in the embodiment, according to Table 1, this MAC frame is determined to be forwarded to the downlink interface 1 designated by the electrical packet switching network forwarding interface information corresponding to the MAC address 00e0-fc09-bcf9. If the downlink interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface corresponding to the destination MAC address of the MAC frame. For example, according to the aforementioned exemplary MAC frame of which the destination MAC address is 00e0-fc09-bcf9, said MAC frame is switched to the downlink interface 1 designated by the electrical packet switching network forwarding interface information corresponding to the MAC address 00e0-fc09-bcf9.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determine the uplink electrical packet switching network interface or the downlink interface corresponding to the destination MAC address of the MAC frame to be used for switching the MAC frame. For example, a MAC frame of which the destination MAC address is 000e-0c6f-6e82 is received from a certain downlink interface, the MAC frame satisfies the aforementioned conditions in the embodiment, according to Table 1, this MAC frame is determined to be forwarded to the uplink electrical packet switching network interface 2 designated by the electrical packet switching network forwarding interface information corresponding to the MAC address 000e-0c6f-6e82. If the downlink interface or the uplink electrical packet switching network interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface or the uplink electrical packet switching network interface corresponding to the destination MAC address of the MAC frame. For example, according to the aforementioned exemplary MAC frame of which destination MAC address is 000e-0c6f-6e82, the MAC frame satisfies the aforementioned conditions in the embodiment, according to Table 1, this MAC frame is switched to the uplink electrical packet switching network interface 2 designated by the electrical packet switching network forwarding interface information corresponding to the MAC address 000e-0c6f-6e82.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame. For example, a MAC frame of which the destination MAC address is 000e-0c6f-6e82 is received from a certain downlink interface, the MAC frame satisfies the aforementioned conditions in the embodiment, according to Table 1, this MAC frame is determined to be forwarded to the uplink electrical packet switching network interface 2 designated by the electrical packet switching network forwarding interface information corresponding to the MAC address 000e-0c6f-6e82. If the downlink interface or the uplink electrical packet switching network interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface or the uplink electrical packet switching network interface corresponding to the destination MAC address of the MAC frame. For example, according to the aforementioned exemplary MAC frame of which the destination MAC address is 000e-0c6f-6e82, the MAC frame satisfies the aforementioned conditions in the embodiment, according to Table 1, this MAC frame is switched to the uplink electrical packet switching network interface 2 designated by the electrical packet switching network forwarding interface information corresponding to the MAC address 000e-0c6f-6e82.

It should be noted that, since when the electrical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, no matter whether the MAC frame is a protocol frame or not, always determining the downlink interface or the uplink electrical packet switching network interface of the present broadcast domain to be used for switching the MAC frame, thus, for the aforementioned embodiment, namely, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then the determining the downlink interface or the uplink electrical packet switching network interface corresponding to the destination MAC address of the MAC frame to be used for switching the MAC frame actually contains two situations, which are: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is a protocol frame according to the MAC frame control information, and the optical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame; the other situation is that, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the optical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame.

It can be seen from the embodiments of the present invention, this kind of MAC frames such as a broadcast frame, a multicast frame or a protocol frame, arrives at the destination via the downlink interface and/or the uplink electrical packet switching network interface and through the electrical data packet network, thus, broadcasting/multicasting and good network management controlling functions of the electrical packet switching device in the prior art can be used, thereby simplifying network managing and switching functions of the switching device in the optical network, avoiding technical difficulties when realizing complex management controlling and broadcasting functions in the optical domain in optical switching, and rendering the optical packet switching device easy to be realized.

Figure 4:
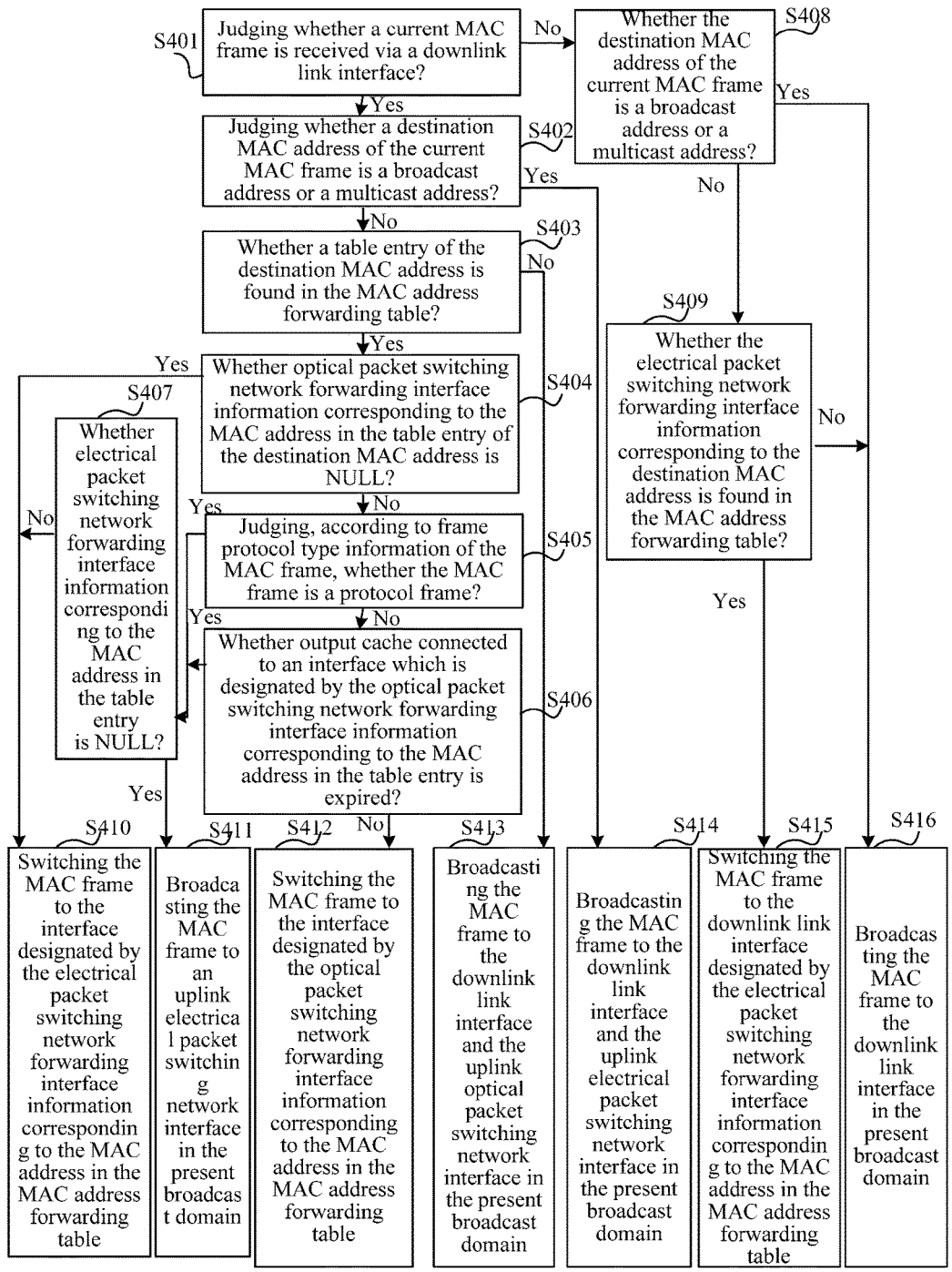
FIG. 4 is a schematic flowchart of a method for data packet switching according to another embodiment of the present invention.

To describe the aforementioned embodiments more clearly, please refer to the schematic flowchart of the method for data packet switching illustrated in FIG. 4. The method for data packet switching illustrated in FIG. 4 includes step S401 to step S416, which are described in detail as follows:

step S401, judging whether a current MAC frame is received via a downlink interface, namely, judging whether the MAC frame is from a downlink interface, if the MAC frame is from a downlink interface, then the procedure turns to step S402, otherwise, the procedure turns to step S408;

step S402, judging whether a destination MAC address of the current MAC frame is a broadcast address or a multicast address, if yes, the procedure turns to step S414, otherwise, the procedure turns to step S403;

step S403, performing a query on a MAC address forwarding table, and determining whether a table entry of the destination MAC address is found in the MAC address forwarding table, if the table entry of the destination MAC address is found in the MAC address forwarding table, the procedure turns to step S404, otherwise, the procedure turns to step S413;

step S404, judging whether optical packet switching network forwarding interface information corresponding to the MAC address in the table entry of the destination MAC address is NULL, if yes, the procedure turns to step S410, otherwise, the procedure turns to step S405;

step S405, judging whether the MAC frame is a protocol frame according to frame protocol type information (length/type information) of the MAC frame, if yes, the procedure turns to step S407, otherwise, the procedure turns to step S406;

step S406, judging whether an output cache connected to an interface which is designated by the optical packet switching network forwarding interface information corresponding to the MAC address in the table entry is overflowed, if yes, the procedure turns to step S407, otherwise, the procedure turns to step S412;

step S407, judging whether electrical packet switching network forwarding interface information corresponding to the MAC address in the table entry is NULL, if yes, the procedure turns to step S411, otherwise, the procedure turns to step S410;

step S408, judging whether the destination MAC address of the MAC frame is a broadcast address or a multicast address, if yes, the procedure turns to step S416, otherwise, the procedure turns to step S409;

step S409, performing a query on the MAC address forwarding table, and determining whether the electrical packet switching network forwarding interface information corresponding to the destination MAC address is found in the MAC address forwarding table. If the electrical packet switching network forwarding interface information corresponding to the MAC address is found in the MAC address forwarding table, i.e., the table entry of the destination MAC address exists in the MAC address forwarding table, and the electrical packet switching network forwarding interface information corresponding to the MAC address in the table entry is not NULL, then the procedure turns to step S415, if the electrical packet switching network forwarding interface information corresponding to the MAC address is not found, i.e., the table entry of the destination MAC address does not exist in the MAC address forwarding table, or the table entry of the destination MAC address exists in the MAC address forwarding table while the electrical packet switching network forwarding interface information corresponding to the MAC address in the table entry is NULL, the procedure turns to step S416;

step S410, switching the MAC frame to the interface designated by the electrical packet switching network forwarding interface information corresponding to the MAC address in the MAC address forwarding table. Specifically, the interface may be a downlink interface or an uplink optical packet switching network interface designated by the electrical packet switching network forwarding interface information, the procedure is over.

Step S411, determining a broadcast domain of the MAC frame according to a VLAN ID of the MAC frame, and broadcasting the MAC frame to an uplink electrical packet switching network interface in the present broadcast domain, the procedure is over.

Step S412, switching the MAC frame to the interface designated by the optical packet switching network forwarding interface information corresponding to the MAC address in the MAC address forwarding table. Specifically, the interface may be an uplink optical packet switching network interface designated by the optical packet switching network forwarding interface information, the procedure is over.

Step S413, determining a broadcast domain of the MAC frame according to a VLAN ID of the MAC frame, and broadcasting the MAC frame to the downlink interface and the uplink optical packet switching network interface in the present broadcast domain, the procedure is over.

Step S414, determining a broadcast domain of the MAC frame, according to a VLAN ID of the MAC frame, and broadcasting the MAC frame to the downlink interface and the uplink electrical packet switching network interface in the present broadcast domain, the procedure is over.

Step S415, switching the MAC frame to the downlink interface designated by the electrical packet switching network forwarding interface information corresponding to the MAC address in the MAC address forwarding table, the procedure is over.

Step S416, determining a broadcast domain of the MAC frame according to a VLAN ID of the MAC frame, and broadcasting the MAC frame to the downlink interface in the present broadcast domain, the procedure is over.

It can be seen from the method for data packet switching provided in aforementioned embodiments of the present invention that, since the interface used for switching the MAC frame includes the downlink interface, the uplink electrical packet switching network interface and/or the uplink optical packet switching network interface, the MAC frame may be switched to the electrical network and/or the optical switching network via any one or more of the aforementioned interfaces, and arrives at a destination device through the server, the core layer electrical packet switching device and/or the core layer optical packet switching device therein. Comparing with the prior art, the method provided in the present invention comprehensively takes a forwarding mechanism into account and combines with the feature of traffic in the data center, thereby optimally designing respective bandwidths of three interfaces in the access switch, including a downlink interface, an uplink electrical packet switching network interface and an uplink optical packet switching network interface, thus the utilization rate of each interface can be improved.

Figure 5:
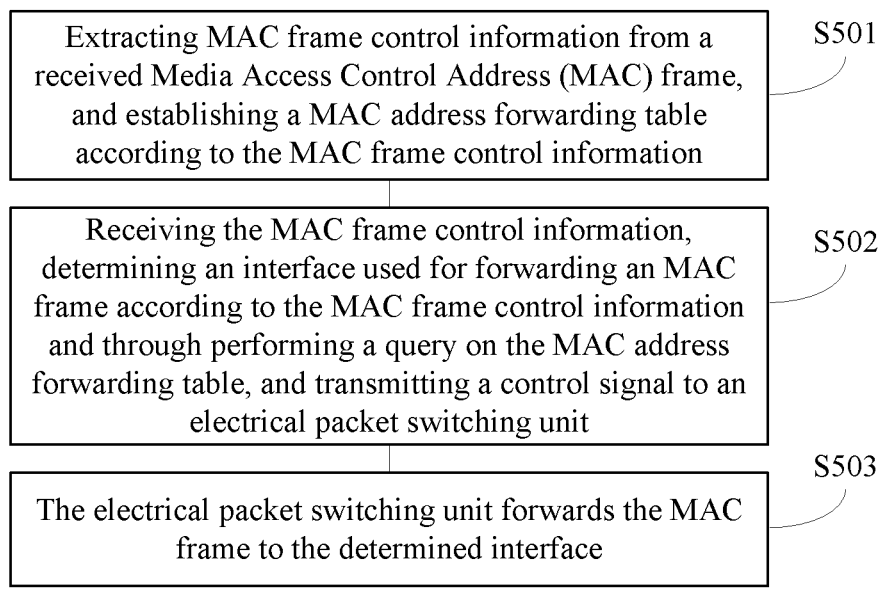
FIG. 5 is a schematic flowchart of a method for data packet switching according to another embodiment of the present invention.

Please refer to FIG. 5, which is a schematic flowchart of a method for data packet switching according to another embodiment of the present invention, where the entity executing the method may be an access switch provided in embodiments of the present invention or a functional module/unit therein. The method for data packet switching illustrated in FIG. 5 mainly includes step S501, step S502 and step S503, which are described in detail as follows:

S501, extracting MAC frame control information from a received Media Access Control Address (MAC) frame, and establishing a MAC address forwarding table according to the MAC frame control information.

The MAC frame control information includes one of a source MAC address, a destination MAC address, a virtual local area network identification and frame protocol type information, or any combination thereof, for example, may be a combination of the source MAC address, the destination MAC address, the virtual local area network (V-LAN) identifier and the frame protocol type information. After parsing out the MAC frame, the Ethernet packet transceiving unit or an optical packet transceiving unit in the access switch provided in embodiments of the present invention extract the MAC frame control information from the MAC frame and establish the MAC address forwarding table according to the MAC frame control information, where the established MAC address forwarding table is shown in the above Table 1. As one embodiment of the present invention, the establishing the MAC address forwarding table according to the MAC frame control information includes: if a table entry corresponding to the source MAC address does not exist in the MAC address, then establishing the table entry corresponding to the source MAC address, where the process of establishing the table entry includes setting electrical packet switching network forwarding interface information or optical packet switching network forwarding interface information to be an electrical packet switching network interface or an uplink optical packet switching network interface on which the MAC frame is received; if a table entry corresponding to the source MAC address exists in the MAC address forwarding table, then updating the electrical packet switching network forwarding interface information or the optical packet switching network forwarding interface information, which is already included in the table entry corresponding to the source MAC address, to be an electrical packet switching network interface or an uplink optical packet switching network interface on which the MAC frame is received. It should be noted that, in the embodiment of the present invention, the electrical packet switching network interface includes an uplink electrical packet switching network interface and a downlink interface. The method for establishing the MAC address forwarding table is described in the following by taking, respectively, processes of MAC address learning performed by the Ethernet packet transceiving unit and the optical packet transceiving unit in the access switch examples.

Firstly, the method for establishing the MAC address forwarding table by the Ethernet packet transceiving unit is described. After receiving data, the Ethernet packet transceiving unit restores the MAC frame, extracts the source MAC address and the VLAN ID from the MAC frame, then judges whether the MAC address is already included in the MAC address forwarding table. If the source MAC address is already included in the MAC address forwarding table, i.e., the source MAC address can be found in the MAC address column of the MAC address forwarding table shown in Table 1, then update the electrical packet switching network forwarding interface information according to the electrical packet switching network interface on which the currently MAC frame is received, and simultaneously update information such as ageing time of the MAC address in the meantime. If the MAC address is not included in the MAC address forwarding table, i.e., the source MAC address cannot be found in the MAC address column of the MAC address forwarding table shown in Table 1, then create a piece of forwarding information for the MAC address, set the electrical packet switching network forwarding interface information to be the uplink electrical packet switching network interface or the downlink interface on which the MAC frame is received, set the optical packet switching network forwarding interface information to be NULL, and simultaneously set information such as the ageing time of the MAC address in the meantime. Take the MAC address learning performed by the Ethernet packet transceiving unit, which connects to the uplink electrical packet switching network interface of which the interface number is i (the uplink electrical packet switching network interface i for short), as an example, an source MAC address, which is extracted by the Ethernet packet transceiving unit after receiving an Ethernet frame, is 00e0-fe09-bafe, if the MAC address exists in the MAC address forwarding table shown in Table 1, update the electrical packet switching network forwarding interface information to be the uplink electrical packet switching network interface i, simultaneously, update the ageing time of the MAC address to be an initial value; if the MAC address is not included in the MAC address forwarding table shown in Table 1, then create a piece of table entry for the MAC address 00e0-fe09-bafe, set the electrical packet switching network forwarding interface information to be the uplink electrical packet switching network interface i, set the ageing time of the MAC address to be an initial value, and set the optical packet switching network forwarding interface information to be NULL.

Further, the method for establishing the MAC address forwarding table by the optical packet transceiving unit is described. After the optical packet transceiving unit restores the MAC frame from the received data, extracts the source MAC address and the VLAN ID from the MAC frame, then judges whether the source MAC address is included in the MAC address forwarding table. If the source MAC address is already included in the MAC address forwarding table, then update the optical packet switching network forwarding interface information according to the uplink optical packet switching network interface on which the currently received MAC frame, and simultaneously update information such as the ageing time of the MAC address. If the MAC address is not included in the MAC address forwarding table, then create a piece of forwarding information for the MAC address, set the optical packet switching network forwarding interface information to be the uplink optical packet switching network interface on which the MAC frame is received, set the electrical packet switching network forwarding interface information to be NULL, and simultaneously initialize information such as the ageing time of the MAC address.

S502, receiving the MAC frame control information, determining an interface used for forwarding an MAC frame according to the MAC frame control information and through performing a query on the MAC address forwarding table, and transmitting a control signal to an electrical packet switching unit.

The interface used for forwarding the MAC frame includes a downlink interface, an uplink electrical packet switching network interface and/or an uplink optical packet switching network interface.

S503, the electrical packet switching unit forwards the MAC frame to the determined interface.

The controller in the access switch receives the MAC frame control information. As an embodiment of determining the interface used for forwarding the MAC frame according to the MAC frame control information and through performing a query on the MAC address forwarding table, it may be: if the MAC frame is from a downlink interface, and the destination MAC address of the MAC frame is not a broadcast address or a multicast address, and it is found that a table entry corresponding to the destination MAC address of the MAC frame exists in the MAC address table, and optical packet switching network forwarding interface information in the MAC address forwarding table is not NULL, and it is judged that the MAC frame is not a protocol frame according to the control information, and output cache which corresponds to the uplink optical packet switching network interface corresponding to the destination MAC address of the MAC frame is not overflowed, then determine the uplink optical packet switching network interface corresponding to the destination MAC address of the MAC frame to be used for forwarding the MAC frame. For example, a MAC frame of which the destination MAC address is 000e-0c6f-6e82 is received from a certain downlink interface, the MAC frame satisfies the aforementioned conditions, according to Table 1, this MAC frame is determined to be forwarded to the uplink optical packet switching network interface 1 designated by the optical packet switching network forwarding interface information corresponding to the MAC address 000e-0c6f-6e82. If the uplink optical packet switching network interface corresponding to the destination MAC address of the MAC frame is determined to be used for switching the MAC frame, correspondingly, the transmitting the control signal to the electrical packet switching unit, so that the MAC frame is forwarded to the determined interface includes: transmitting the control signal to the electrical packet switching unit, so that the MAC frame is forwarded to the uplink optical packet switching network interface corresponding to the destination MAC address of the MAC frame, for example, according to the aforementioned exemplary MAC frame of which the destination MAC address is 000e-0c6f-6e82, the MAC frame is forwarded to the uplink optical packet switching network interface 1 designated by the optical packet switching network forwarding interface information corresponding to the MAC address 000e-0c6f-6e82. In the embodiment, if the MAC frame is none of a protocol frame, a broadcast frame or a multicast frame, namely, if the MAC frame is a data frame, then the MAC frame is preferentially forwarded to the uplink optical packet switching network interface, and arrives at the destination through the optical data packet network, thereby making full use of the advantage of the optical switching, that is, the switching capacity is large, and improving the forwarding or switching efficiency of long data streams.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding address, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then the determining the downlink interface and/or the uplink electrical packet switching network interface to be used for forwarding the MAC frame may be: if the destination MAC address of the MAC frame is a broadcast address or a multicast address, or the table entry corresponding to the destination MAC address of the MAC frame is not found in the MAC address forwarding address, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding address, then determining the downlink interface and/or the uplink electrical packet switching network interface of the present broadcast domain to be used for broadcasting the MAC frame. If the downlink interface and/or the uplink electrical packet switching network interface of the present broadcast domain are (is) to be used for broadcasting the MAC frame, correspondingly, the transmitting the control signal to the electrical packet switching unit, so that the MAC frame is forwarded to the determined interface includes: transmitting the control signal to the electrical packet switching unit, so that the MAC frame is broadcasted to the downlink interface and/or the uplink electrical packet switching network interface of the present broadcast domain.

For the aforementioned embodiment, namely, if the destination MAC address of the MAC frame is a broadcast address or a multicast address, or the table entry corresponding to the destination MAC address of the MAC frame is not found in the MAC address forwarding address, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding address, as one of the embodiments of the present invention, namely, if the MAC frame is not from a downlink interface, then the determining the downlink interface and/or the uplink electrical packet switching network interface of the present broadcast domain to be used for forwarding the MAC frame may be: if the MAC frame is not from a downlink interface and the destination MAC address of the MAC frame is a broadcast address or a multicast address, or if the MAC frame is not from a downlink interface, and the destination MAC address of the MAC frame is not a broadcast address or a multicast address, and the electrical packet switching network forwarding interface information corresponding to the destination MAC address of the MAC frame is not found in the MAC address forwarding table, then determining the downlink interface of the present broadcast domain to be used for broadcasting the MAC frame. Correspondingly, if the downlink interface of the broadcast domain is determined to be used for broadcasting the MAC frame, the transmitting the control signal to the electrical packet switching unit, so that the MAC frame is forwarded to the determined interface may be: transmitting the control signal to the electrical packet switching unit, so that the MAC frame is broadcasted to the downlink interface of the broadcast domain.

For the aforementioned embodiment, namely, if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, if the destination MAC address of the MAC frame is a broadcast address or a multicast address, then the determining the downlink interface and/or the uplink electrical packet switching network interface of the present broadcast domain to be used for forwarding the MAC frame may be: if the MAC frame is from a downlink interface and the destination MAC address of the MAC frame is a broadcast address or a multicast address, then determining the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, the transmitting the control signal to the electrical packet switching unit, so that the MAC frame is forwarded to the determined interface may be: transmitting the control signal to the electrical packet switching unit, so that the MAC frame is broadcasted to the downlink interface and the uplink electrical packet switching network interface of the present broadcast domain.

For the aforementioned embodiment, namely, if the destination MAC address of the MAC frame is a broadcast address or a multicast address, the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, if the table entry corresponding to the destination MAC address of the MAC frame is not found in the MAC address forwarding table, then the determining the downlink interface and/or the uplink electrical packet switching network interface of the present broadcast domain to be used for forwarding the MAC frame may be: if the MAC frame is from a downlink interface, and the destination MAC address of the MAC frame is not a broadcast address or a multicast address, and the table entry corresponding to the destination MAC address of the MAC frame is not found in the MAC address forwarding table, then determining the downlink interface and the uplink electrical packet switching network interface of the present broadcast domain to be used for broadcasting the MAC frame. If the downlink interface and the uplink electrical packet switching network interface of the present broadcast domain are determined to be used for broadcasting the MAC frame, then the transmitting the control signal to the electrical packet switching unit, so that the MAC frame is forwarded to the determined interface may be: transmitting the control signal to the electrical packet switching unit, so that the MAC frame is broadcasted to the downlink interface and the uplink electrical packet switching network interface of the present broadcast domain.

For the aforementioned embodiment, namely, if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, as one of the embodiments of the present invention, namely, the electrical packet switching network forwarding interface information corresponding to the destination MAC address of the MAC frame in the MAC address forwarding table is NULL, the determining the downlink interface and/or the uplink electrical packet switching network interface of the present broadcast domain to be used for forwarding the MAC frame may be: if the MAC frame is from a downlink interface, and the destination MAC address of the MAC frame is not a broadcast address or a multicast address, and it is found that the table entry corresponding to the destination MAC address of the MAC frame exists in the MAC address forwarding table, and optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determining the uplink electrical packet switching network interface of the broadcast domain to be used for broadcasting the MAC frame. If the uplink electrical packet switching network interface of the present broadcast domain is determined to be used for broadcasting the MAC frame, then the transmitting the control signal to the electrical packet switching unit, so that the MAC frame is forwarded to the determined interface may be: transmitting the control signal to the electrical packet switching unit, so that the MAC frame is broadcasted to the uplink electrical packet switching network interface of the present broadcast domain.

It should be noted that, since when the electrical packet switching network forwarding interface information corresponding to the destination MAC address of the MAC frame in the MAC address forwarding table is NULL, and the output cache which corresponds to the uplink optical packet switching network interface corresponding to the destination MAC address of the MAC frame is overflowed, no matter whether the MAC frame is a protocol frame or not, always determining the uplink electrical packet switching network interface of this broadcast domain to be used for broadcasting the MAC frame, thus, for the aforementioned embodiment, namely, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then the determining the uplink electrical packet switching network interface of the present broadcast domain to be used for broadcasting the MAC frame actually contains two situations, which are: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame; the other situation is that, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is not from a downlink interface, and the destination MAC address of the MAC frame is not a broadcast address or a multicast address, and electrical packet switching network forwarding interface information corresponding to the destination MAC address of the MAC frame is found in the MAC address forwarding table, then determine the downlink interface corresponding to the destination MAC address of the MAC frame to be used for switching the MAC frame. For example, a MAC frame of which the destination MAC address is 00e0-fc09-bcf9 is received from a certain uplink electrical packet switching network interface or a certain uplink optical packet switching network interface, the MAC frame satisfies the aforementioned conditions in the embodiment, according to Table 1, this MAC frame is determined to be forwarded to the downlink interface 1 designated by the electrical packet switching network forwarding interface information corresponding to the MAC address 00e0-fc09-bcf9. If the downlink interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface corresponding to the destination MAC address of the MAC frame. For example, according to the aforementioned exemplary MAC frame of which the destination MAC address is 00e0-fc09-bcf9, the MAC frame satisfies the aforementioned conditions in the embodiment, according to Table 1, switching the MAC frame to the downlink interface 1 designated by the electrical packet switching network forwarding interface information corresponding to the MAC address 00e0-fc09-bcf9.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or judging that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determine the uplink electrical packet switching network interface or the downlink interface corresponding to the destination MAC address of the MAC frame to be used for switching the MAC frame. For example, a MAC frame of which the destination MAC address is 000e-0c6f-6e82 is received from a certain downlink interface, the MAC frame satisfies the aforementioned conditions in the embodiment, according to Table 1, this MAC frame is determined to be forwarded to the uplink electrical packet switching network interface 2 designated by the electrical packet switching network forwarding interface information corresponding to the MAC address 000e-0c6f-6e82. If the downlink interface or the uplink electrical packet switching network interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface or the uplink electrical packet switching network interface corresponding to the destination MAC address of the MAC frame. For example, according to the aforementioned exemplary MAC frame of which the destination MAC address is 000e-0c6f-6e82, the MAC frame satisfies the aforementioned conditions in the embodiment, according to Table 1, this MAC frame is switched to the uplink electrical packet switching network interface 2 designated by the electrical packet switching network forwarding interface information corresponding to the MAC address 000e-0c6f-6e82.

In a situation opposite to the aforementioned embodiment, namely, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or judging that the MAC frame is a protocol frame according to the MAC frame control information, or the output cache which corresponds to the uplink optical packet switching network interface corresponding to the destination MAC address of the MAC frame is overflowed, then determine the downlink interface and/or the uplink electrical packet switching network interface of the present broadcast domain to be used for broadcasting the MAC frame, one of the embodiments of the present invention may be: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame. For example, a MAC frame of which the destination MAC address is 000e-0c6f-6e82 is received from a certain downlink interface, the MAC frame satisfies the aforementioned conditions in the embodiment, according to Table 1, this MAC frame is determined to be forwarded to the uplink electrical packet switching network interface 2 designated by the electrical packet switching network forwarding interface information corresponding to the MAC address 000e-0c6f-6e82. If the downlink interface or the uplink electrical packet switching network interface corresponding to the destination MAC address of the MAC frame is determined to be used for switching the MAC frame, then the transmitting the control signal to the electrical packet switching unit, so that the MAC frame is forwarded to the determined interface may be: transmitting the control signal to the electrical packet switching unit, so that the MAC frame is switched to the downlink interface or the uplink electrical packet switching network interface corresponding to the destination MAC address of the MAC frame. For example, according to the aforementioned exemplary MAC frame of which the destination MAC address is 000e-0c6f-6e82, the MAC frame satisfies the aforementioned conditions in the embodiment, according to Table 1, this MAC frame is switched to the uplink electrical packet switching network interface 2 designated by the electrical packet switching network forwarding interface information corresponding to the MAC address 000e-0c6f-6e82.

It should be noted that, since when the electrical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, no matter whether the MAC frame is a protocol frame or not, always determining the downlink interface or the uplink electrical packet switching network interface of the present broadcast domain to be used for switching the MAC frame, thus, for the aforementioned embodiment, namely, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then the determining the downlink interface or the uplink electrical packet switching network interface corresponding to the destination MAC address of the MAC frame to be used for switching the MAC frame actually contains two situations, which are: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is a protocol frame according to the MAC frame control information, and the optical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame; the other situation is that, if the MAC frame is from a downlink interface, and the destination MAC address of the MAC frame is not a broadcast address or a multicast address, the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and it is judged that the MAC frame is not a protocol frame according to the MAC frame control information, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the optical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame.

It can be seen from the embodiments of the present invention, this kind of MAC frames such as a broadcast frame, a multicast frame or a protocol frame, arrives at the destination via the downlink interface and/or the uplink electrical packet switching network interface and through the electrical data packet network, thus, broadcasting/multicasting and good network management controlling functions of the electrical packet switching device in the prior art can be used, thereby simplifying network managing and switching functions of the switching device in the optical network, avoiding technical difficulties when realizing complex management controlling and broadcasting functions in the optical domain in optical switching, and rendering the optical packet switching device easy to be realized.

Figure 6:
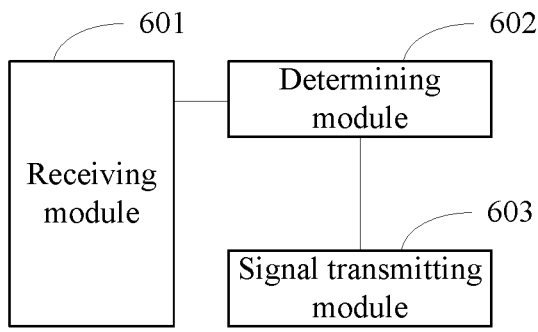
FIG. 6 is a schematic structural diagram of an apparatus for data packet switching according to an embodiment of the present invention.

Please refer to FIG. 6, which is a schematic structural diagram of an apparatus for data packet switching according to an embodiment of the present invention. To describe more clearly, only components relevant to the embodiment of the present invention are illustrated here. The apparatus for data packet switching illustrated in FIG. 6 may be a functional module in the access switch provided in the embodiment of the present invention, for example, the controller or a functional module in the controller. The apparatus for data packet switching illustrated in FIG. 6 mainly includes a receiving module 601, a determining module 602 and a signal transmitting module 603, where:

the receiving module 601 is configured to receive Media Access Control Address (MAC) frame control information, where the MAC frame control information includes one of a destination MAC address, a virtual local area network identifier and frame protocol type information, or any combination thereof;

the determining module 602 is configured to determine an interface used for forwarding the MAC frame according to the MAC frame control information and through performing a query on a MAC address forwarding table, where the interface used for forwarding the MAC frame includes a downlink interface, an uplink electrical packet switching network interface and/or an uplink optical packet switching network interface;

the signal transmitting module 603 is configured to transmit a control signal to an electrical packet switching unit, so that the MAC frame is forwarded to the determined interface.

It should be noted that, in the aforementioned implementation of the apparatus for data packet switching, the division of modules is merely for illustration, in an actual application, the aforementioned functions may be distributed to be accomplished by different functional modules according to needs such as considering configuration requirements of relevant hardware or the convenience for the software implementation, namely, the internal structure of the apparatus for data packet switching are divided into different functional modules so as to accomplish all or part of the functions described in the above part. Besides, in the actual application, the corresponding functional modules in the embodiment may be implemented by hardware, and may also be accomplished by hardware through executing corresponding software, for example, the aforementioned transceiving module may be a hardware receiving the Media Access Control Address (MAC) frame control information such as a controller, and may also be a general processor or other hardware devices that can accomplish the aforementioned functions by executing corresponding computer programs; for another example, the aforementioned determining module may be a hardware capable of executing the aforementioned function of determining the interface used for forwarding the MAC frame according to the MAC frame control information and through performing the query on the MAC address forwarding table, such as a determiner, and may also be a general processor or other hardware devices that can accomplish the aforementioned functions by executing corresponding computer programs (all the embodiments provided in the description are applicable to the aforementioned principle).

Figure 7:
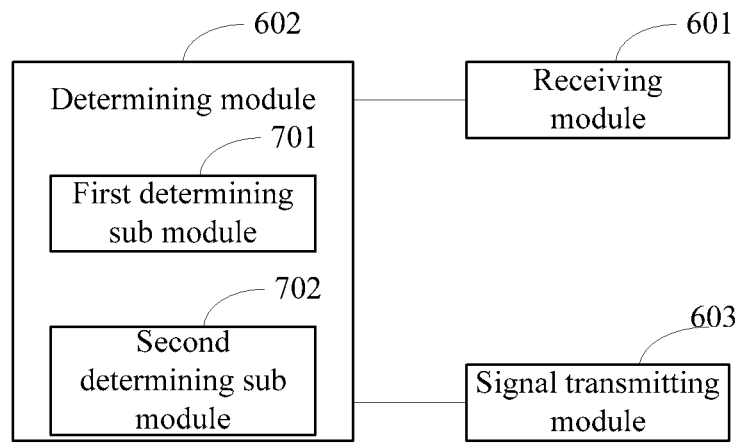
FIG. 7 is a schematic structural diagram of an apparatus for data packet switching according to another embodiment of the present invention.

The determining module 602 may include a first determining sub module 701 and a second determining sub module 702, FIG. 7 is a schematic structural diagram of an apparatus for data packet switching according to another embodiment of the present invention, where:

the first determining sub module 701 is configured to, if the MAC frame is from a downlink interface, and the destination MAC address of the MAC frame is not a broadcast address or a multicast address, and a table entry corresponding to the destination MAC address of the MAC frame is found in the MAC address forwarding table, and optical packet switching network forwarding interface information in the MAC address forwarding table is not NULL, and it is judged that the MAC frame is not a protocol frame according to the control information, and output cache which corresponds to the uplink optical packet switching network interface corresponding to the destination MAC address of the MAC frame is not overflowed, then determine the uplink optical packet switching network interface corresponding to the destination MAC address of the MAC frame to be used for forwarding the MAC frame;

the second determining sub module 702 is configured to, if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determine the downlink interface and/or the uplink electrical packet switching network interface to be used for forwarding the MAC frame. In the apparatus for data packet switching illustrated in FIG. 7, the signal transmitting module 603 is configured to, if the first determining sub module 701 determines the uplink optical packet switching network interface corresponding to the destination MAC address of the MAC frame to be used for switching the MAC frame, transmit the control signal to the electrical packet switching unit, so that the MAC frame is switched to the uplink optical packet switching network interface corresponding to the destination MAC address of the MAC frame.

Figure 8:
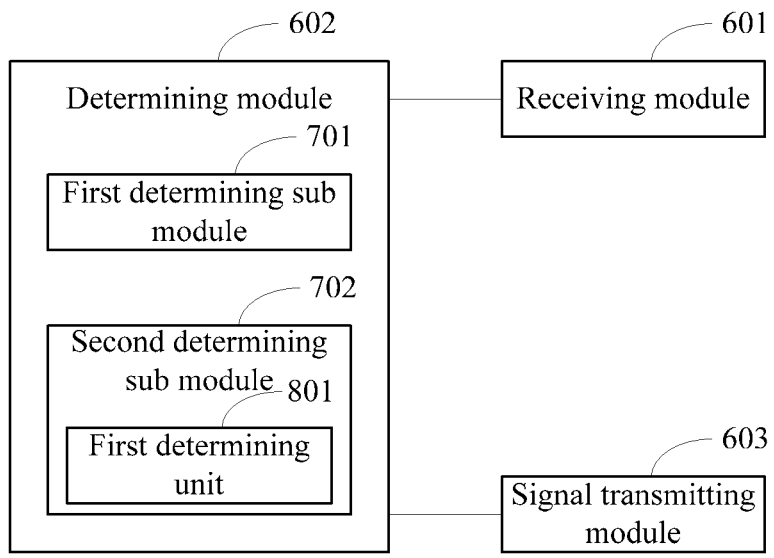
FIG. 8 is a schematic structural diagram of an apparatus for data packet switching according to another embodiment of the present invention.

The second determining sub module 702 illustrated in FIG. 7 may include a first determining unit 801, FIG. 8 is a schematic structural diagram of an apparatus for data packet switching according to another embodiment of the present invention. The first determining unit 801 is configured to, if the destination MAC address of the MAC frame is a broadcast address or a multicast address, or the table entry corresponding to the destination MAC address of the MAC frame is not found in the MAC address forwarding table, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, then determine the downlink interface and/or the uplink electrical packet switching network interface of the present broadcast domain to be used for broadcasting the MAC frame. In the apparatus for data packet switching illustrated in FIG. 8, the signal transmitting module 603 is configured to, if the first determining unit 801 determines the downlink interface and/or the uplink electrical packet switching network interface of the present broadcast domain to be used for broadcasting the MAC frame, transmit the control signal to the electrical packet switching unit, so that the MAC frame is broadcasted to the downlink interface and/or the uplink electrical packet switching network interface of the present broadcast domain.

Figure 9:
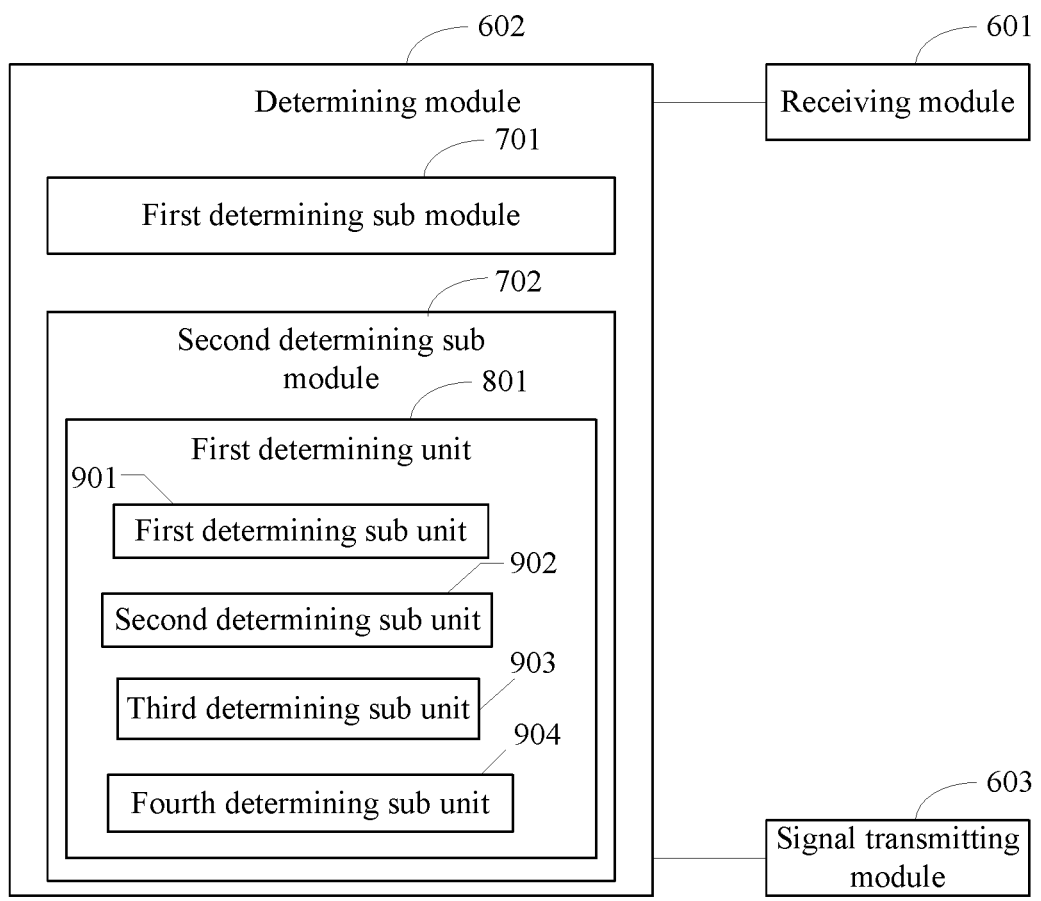
FIG. 9 is a schematic structural diagram of an apparatus for data packet switching according to another embodiment of the present invention.

The first determining unit 801 illustrated in FIG. 8 may include a first determining sub unit 901, a second determining sub unit 902, a third determining sub unit 903 and/or a fourth determining sub unit 904, FIG. 9 is a schematic structural diagram of an apparatus for data packet switching according to another embodiment of the present invention, where:

the first determining sub unit 901 is configured to, if the MAC frame is not from a downlink interface and the destination MAC address of the MAC frame is a broadcast address or a multicast address, or, if the MAC frame is not from a downlink interface and the destination MAC address of the MAC frame is not a broadcast address or a multicast address and the electrical packet switching network forwarding interface information corresponding to the destination MAC address of the MAC frame is not found in the MAC address forwarding table, then determine the downlink interface of this broadcast domain to be used for broadcasting the MAC frame, at this time, the signal transmitting module 603 is configured to, if the first determining sub unit 901 determines the downlink interface of this broadcast domain to be used for broadcasting the MAC frame, transmit the control signal to the electrical packet switching unit, so that the MAC frame is broadcasted to the downlink interface of this broadcast domain;

the second determining sub unit 902 is configured to, if the MAC frame is from a downlink interface, then determine the downlink interface and the uplink electrical packet switching network interface of the present broadcast domain to be used for broadcasting the MAC frame, at this time, the signal transmitting module 603 is configured to, if the second determining sub unit 902 determines the downlink interface and the uplink electrical packet switching network interface of the present broadcast domain to be used for broadcasting the MAC frame, transmit the control signal to the electrical packet switching unit, so that the MAC frame is broadcasted to the downlink interface and the uplink electrical packet switching network interface of the present broadcast domain;

the third determining sub unit 903 is configured to, if the MAC frame is from a downlink interface and the destination MAC address of the MAC frame is not a broadcast address or a multicast address, and the table entry corresponding to the destination MAC address of the MAC frame is not found in the MAC address forwarding table, then determine the downlink interface and the uplink electrical packet switching network interface of the present broadcast domain to be used for broadcasting the MAC frame, at this time, the signal transmitting module 603 is configured to, if the third determining unit 903 determines the downlink interface and the uplink electrical packet switching network interface of the present broadcast domain to be used for broadcasting the MAC frame, transmit the control signal to the electrical packet switching unit, so that the MAC frame is broadcasted to the downlink interface and the uplink electrical packet switching network interface of the present broadcast domain;

the fourth determining unit 904 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of this broadcast domain to be used for broadcasting the MAC frame, at this time, the signal transmitting module 603 is configured to, if the fourth determining unit 904 determines the uplink electrical packet switching network interface of this broadcast domain to be used for broadcasting the MAC frame, transmit the control signal to the electrical packet switching unit, so that the MAC frame is broadcasted to the uplink electrical packet switching network interface of this broadcast domain.

Figure 10:
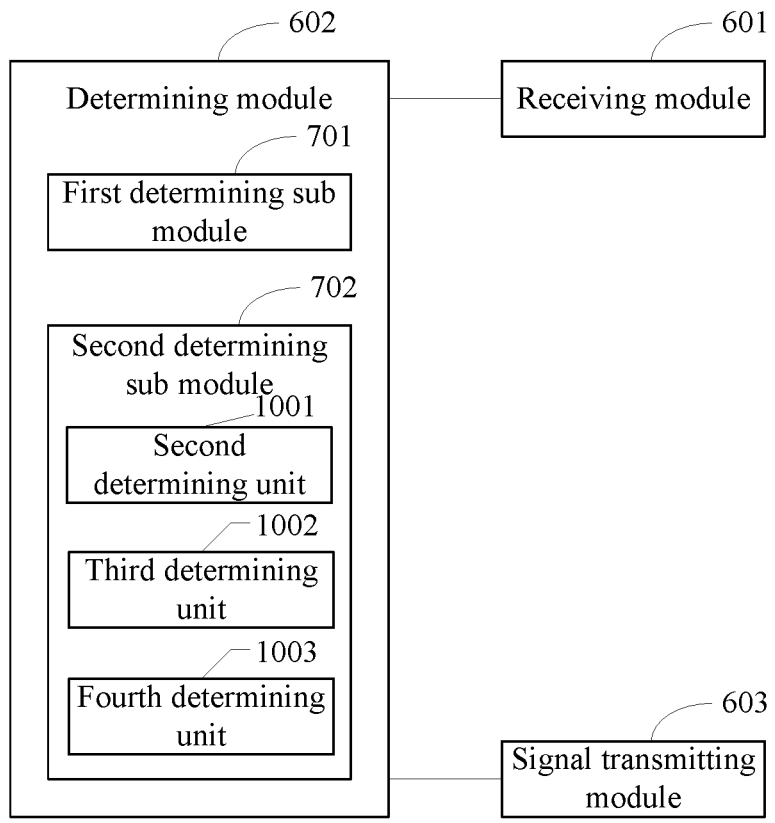
FIG. 10 is a schematic structural diagram of an apparatus for data packet switching according to another embodiment of the present invention.

The second determining sub module 702 illustrated in FIG. 7 may include a second determining unit 1001, a third determining unit 1002 and/or a fourth determining unit 1003, FIG. 10 is a schematic structural diagram of an apparatus for data packet switching according to another embodiment of the present invention, where:

the second determining unit 1001 is configured to, if the MAC frame is not from a downlink interface, and the destination MAC address of the MAC frame is not a broadcast address or a multicast address, and electrical packet switching network forwarding interface information corresponding to the destination MAC address of the MAC frame is found in the MAC address forwarding table, then determine the downlink interface corresponding to the destination MAC address of the MAC frame to be used for switching the MAC frame, at this time, the signal transmitting module 603 is configured to, if the second determining unit 1001 determines the downlink interface corresponding to the destination MAC address of the MAC frame to be used for switching the MAC frame, transmit the control signal to the electrical packet switching unit, so that the MAC frame is switched to the downlink interface corresponding to the destination MAC address of the MAC frame;

the third determining unit 1002 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determine the uplink electrical packet switching network interface or the downlink interface corresponding to the destination MAC address of the MAC frame to be used for switching the MAC frame, at this time, the signal transmitting module 603 is configured to, if the third determining unit 1002 determines the uplink electrical packet switching network interface or the downlink interface corresponding to the destination MAC address of the MAC frame to be used for switching the MAC frame, transmit the control signal to the electrical packet switching unit, so that the MAC frame is switched to the downlink interface or the uplink electrical packet switching network interface corresponding to the destination MAC address of the MAC frame;

the fourth determining unit 1003 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame, at this time, the signal transmitting module 603 is configured to, if the fourth determining unit 1003 determines the downlink interface or the uplink electrical packet switching network interface corresponding to the destination MAC address of the MAC frame to be used for switching the MAC frame, transmit the control signal to the electrical packet switching unit, so that the MAC frame is switched to the downlink interface or the uplink electrical packet switching network interface corresponding to the destination MAC address of the MAC frame.

Figure 11:
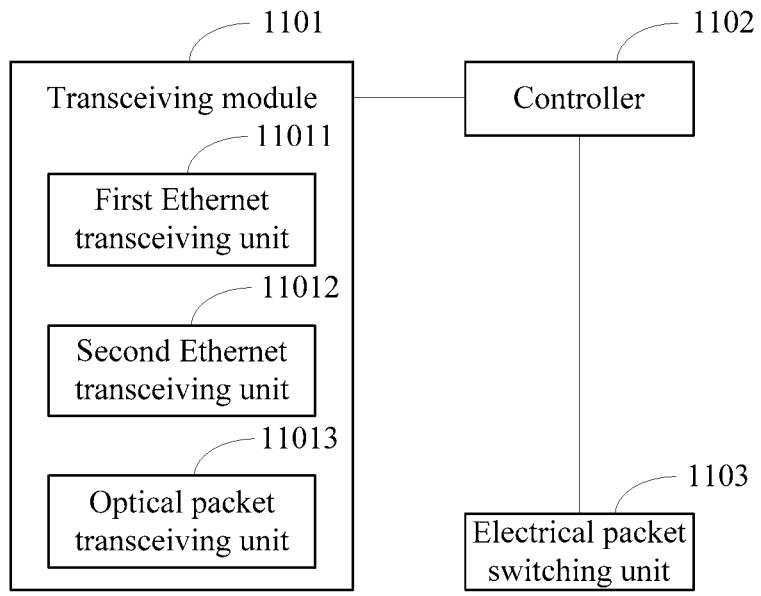
FIG. 11 is a schematic structural diagram of an access switch according to an embodiment of the present invention.

Please refer to FIG. 11, which is a schematic structural diagram of an access switch according to an embodiment of the present invention. To describe more clearly, only components relevant to the embodiment of the present invention are illustrated here. The access switch illustrated in FIG. 11 may be used in a datacenter. The access switch illustrated in FIG. 11 may include a transceiving module 1101, a controller 1102 connecting to the transceiving module 1101, and an electrical packet switching unit 1103 connecting to the controller 1102, where the transceiving module 1101 includes a first Ethernet transceiving unit 11011, a second Ethernet transceiving unit 11012 and an optical packet transceiving unit 11013, where:

the transceiving module 1101 is configured to extract MAC frame control information, from a received Media Access Control Address (MAC) frame, and establish a MAC address forwarding table according to the control information, where the MAC frame control information includes one of a source MAC address, a destination MAC address, a virtual local area network identifier and frame protocol type information, or any combination thereof.

The controller 1102 is configured to receive the MAC frame control information extracted by the transceiving module 1101, determine an interface used for forwarding an MAC frame according to the MAC frame control information and through performing a query on a MAC address forwarding table, and transmit a control signal to the electrical packet switching unit 1103, where the interface used for forwarding the MAC frame includes a downlink interface between the first Ethernet transceiving unit 11011 and a server, an uplink electrical packet switching network interface between the second Ethernet transceiving unit 11012 and a core layer electrical packet switching device, and/or an uplink optical packet switching network interface between the optical packet transceiving unit 11013 and a core layer optical packet switching device.

Figure 19:
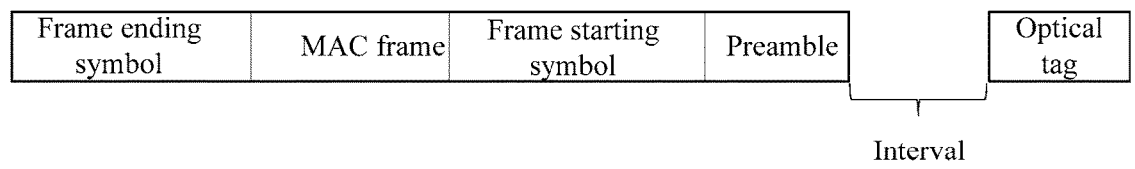
FIG. 19 is a schematic structural diagram of an optical packet structure according to an embodiment of the present invention.

In the access switch illustrated in FIG. 11, the first Ethernet transceiving unit 11011, the second Ethernet transceiving unit 11012 and the optical packet transceiving unit 11013 respectively connect to the electrical packet switching unit 1103 via their respective input/output caches. The controller 1102 executes a certain switching strategy to obtain forwarding interface information of each MAC frame mainly according to the MAC frame control information extracted by the transceiving module 1101 such as a source MAC address, a destination MAC address, a VLAN ID and a frame protocol type message (length/type) and state information of the output cache, then controls the electrical packet switching unit 1103 to accomplish the switching, so that the data packet is output to the corresponding downlink interface, the corresponding uplink electrical packet switching network interface and/or the corresponding uplink optical packet switching network interface, and then enters a server group, or a core layer electrical packet switching device and/or a core layer optical packet switching device connected to the interface for switching. The downlink interface between the first Ethernet transceiving unit 11011 and the server adopts a 1GE or a 10GE standard to communicate with the server, for example, the downlink interface may be a 1G or a 10G network interface and connect to the server via a network cable, or may be a 10G optical port and connect to the server via a fiber link. The uplink electrical packet switching network interface between the second Ethernet transceiving unit 11012 and the core layer electrical packet switching device adopts a standard with a rate of 10GE or 40GE, or an even higher rate, the second Ethernet transceiving unit 11012 communicates with the core layer electrical packet switching device in the electrical packet switching network via the uplink electrical packet switching network interface, where the communicating process is consistent with the standard processing procedure on an interface of an Ethernet device, the details are not described herein. An optical packet or an optical packet is transmitted between the uplink optical packet switching network interface and the core layer optical packet switching device in the optical packet switching network, the optical packet transceiving unit 11013 is configured to re-encapsulate the MAC frame into an optical packet which is suitable to be switched by the core layer optical packet switching device in the optical packet switching network. FIG. 19 shows a possible structure of the optical packet, where an optical tag mainly contains routing information which is used for generating routing control information of a device in the optical packet switching network, a preamble which is used for realizing a restoration and an adjustment such as the "laser on, TIA, LA and bursting clock restoration" of a burst-mode receiver, where a length of the preamble needs to be correspondingly adjusted according to the time at which the burst-mode receiver accomplishes the aforementioned restoration, a frame starting symbol which is used or identifying the starting of a MAC frame, a frame ending symbol which is used for identifying the ending of a photonic frame, and an interval between the preamble and the optical tag which is used for adjusting an optical switch of a device in the optical packet switching network.

The electrical packet switching unit 1103 is configured to forward the MAC frame to the interface determined by the controller 1102. In this embodiment, the electrical packet switching unit 1103 adopts a standard Ethernet switching chip, accomplishes, under the control signal provided by the controller 1102, the whole switching between the downlink interfaces and the whole switching between the uplink electrical packet switching network interface and/or the uplink optical packet switching network interface and the downlink interface.

Figure 12:
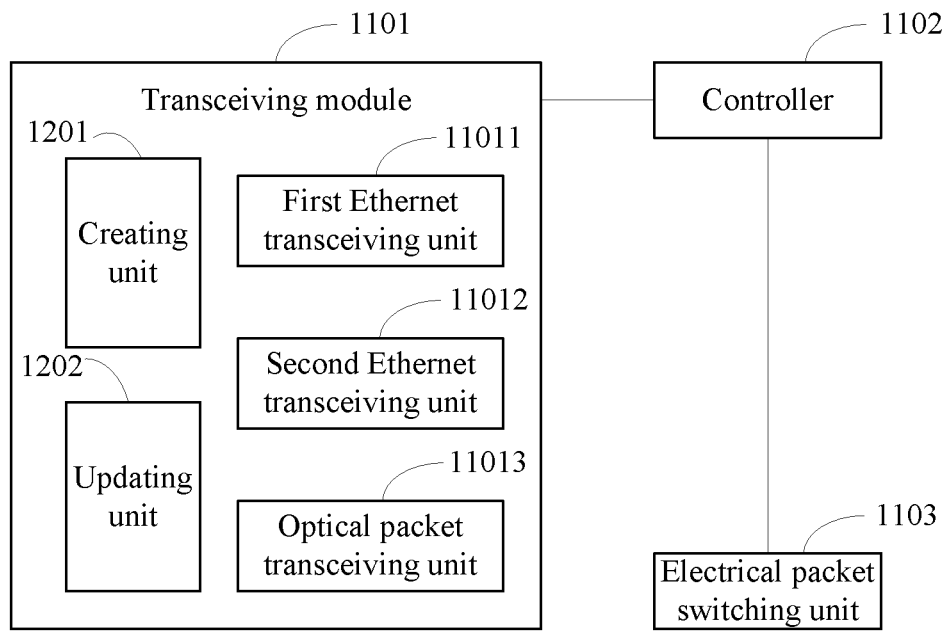
FIG. 12 is a schematic structural diagram of an access switch according to another embodiment of the present invention.

The transceiving module 1101 illustrated in FIG. 11 further includes a creating unit 1201 and an updating unit 1202, FIG. 12 is a schematic structural diagram of an access switch according to another embodiment of the present invention, where:

the creating unit 1201 is configured to, if a table entry corresponding to the source MAC address does not exist in the MAC address forwarding table, then establish the table entry corresponding to the source MAC address, where the establishing the table entry includes: setting electrical packet switching network forwarding interface information or optical packet switching network forwarding interface information to be an electrical packet switching network interface or an uplink optical packet switching network interface on which the MAC frame is received, where the electrical packet switching network interface includes an uplink electrical packet switching network interface and a downlink interface;

the updating unit 1202 is configured to, if a table entry corresponding to the source MAC address exists in the MAC address forwarding table, then update the electrical packet switching network forwarding interface information or the optical packet switching network forwarding interface information, which is already existed in the table entry corresponding to the source MAC address, to be an electrical packet switching network interface or an uplink optical packet switching network interface on which the MAC frame is received.

Figure 13:
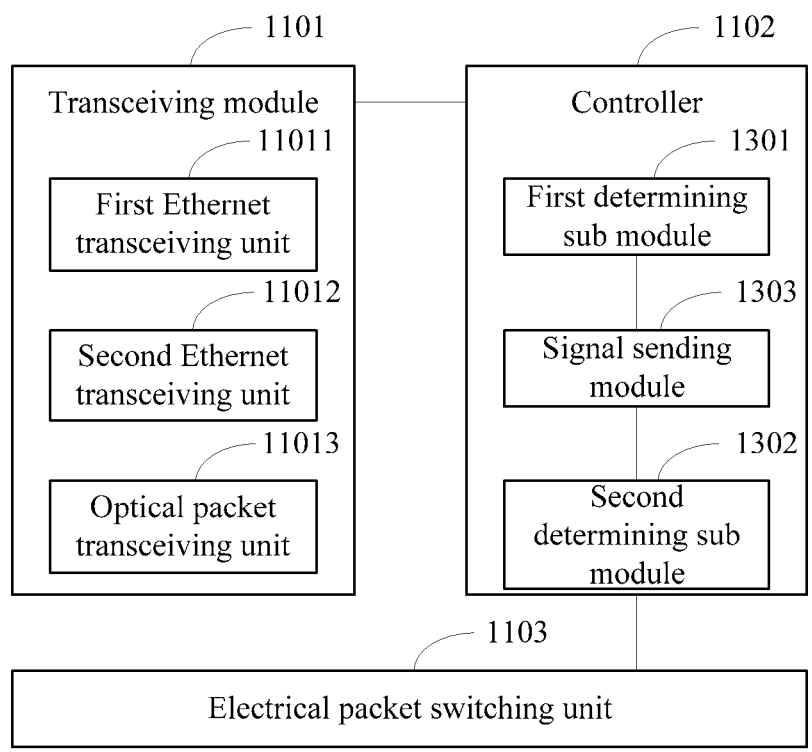
FIG. 13 is a schematic structural diagram of an access switch according to another embodiment of the present invention.

The controller 1102 illustrated in FIG. 11 includes a first determining sub module 1301, a second determining sub module 1302 and a signal transmitting module 1303, FIG. 13 is a schematic structural diagram of an access switch according to another embodiment of the present invention, where:

the first determining sub module 1301 is configured to, if the MAC frame is from a downlink interface, and the destination MAC address of the MAC frame is not a broadcast address or a multicast address, and a table entry corresponding to the destination MAC address of the MAC frame is found in the MAC address forwarding table, and optical packet switching network forwarding interface information in the MAC address forwarding table is not NULL, and it is judged that the MAC frame is not a protocol frame according to the control information, and output cache which corresponds to the uplink optical packet switching network interface corresponding to the destination MAC address of the MAC frame is not overflowed, then determine the uplink optical packet switching network interface corresponding to the destination MAC address of the MAC frame to be used for switching the MAC frame;

the second determining sub module 1302 is configured to if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is not NULL, or it is judged that the MAC frame is a protocol frame according to the control information, or output cache which corresponds to the uplink optical packet switching network interface corresponding to the destination MAC address of the MAC frame is overflowed, then determine the downlink interface and/or the uplink electrical packet switching network interface to be used for forwarding the MAC frame;

the signal transmitting module 1303 is configured to, if the first determining sub module 1301 determines the uplink optical packet switching network interface corresponding to the destination MAC address of the MAC frame to be used for switching the MAC frame, transmit the control signal to the electrical packet switching unit 1103, so that the MAC frame is switched to the uplink optical packet switching network interface corresponding to the destination MAC address of the MAC frame.

Figure 14:
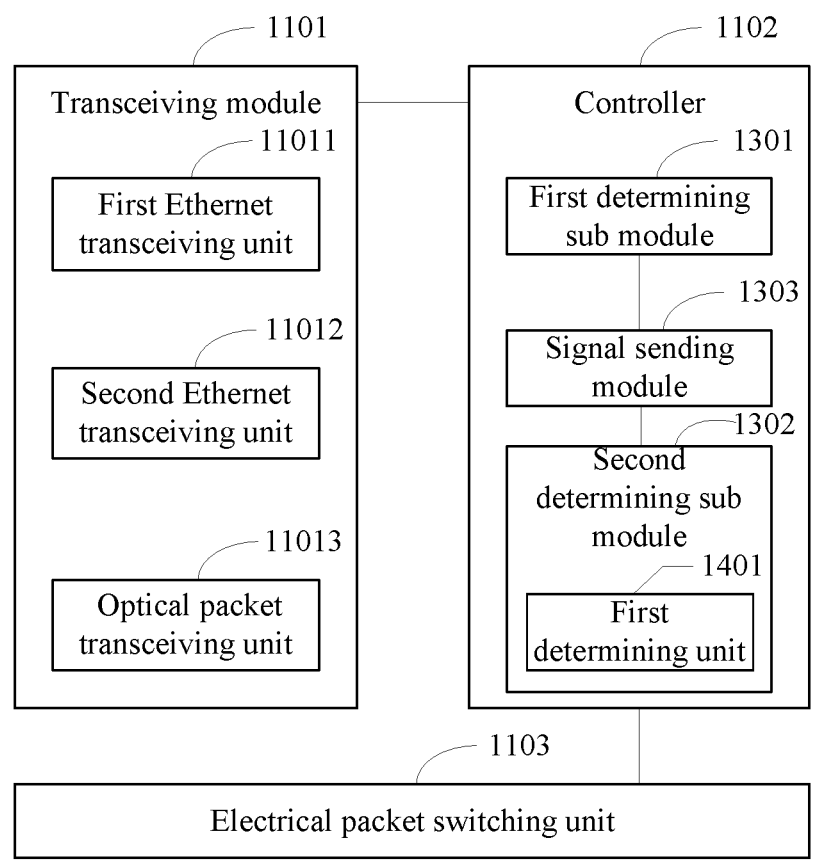
FIG. 14 is a schematic structural diagram of an access switch according to another embodiment of the present invention.

The second determining sub module 1302 illustrated in FIG. 13 includes a first determining unit 1401, FIG. 14 is a schematic structural diagram of an access switch according to another embodiment of the present invention. The first determining unit 1401 is configured to, if the destination MAC address of the MAC frame is a broadcast address or a multicast address, or the table entry corresponding to the destination MAC address of the MAC frame is not found in the MAC address forwarding table, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, then determine the downlink interface and/or the uplink electrical packet switching network interface of the present broadcast domain to be used for broadcasting the MAC frame. In the access switch illustrated in FIG. 14, the signal transmitting module 1303 is configured to, if the first determining unit 1401 determines the downlink interface and/or the uplink electrical packet switching network interface of the present broadcast domain to be used for broadcasting the MAC frame, transmit the control signal to the electrical packet switching unit 1103, so that the MAC frame is broadcasted to the downlink interface and/or the uplink electrical packet switching network interface of the present broadcast domain.

Figure 15:
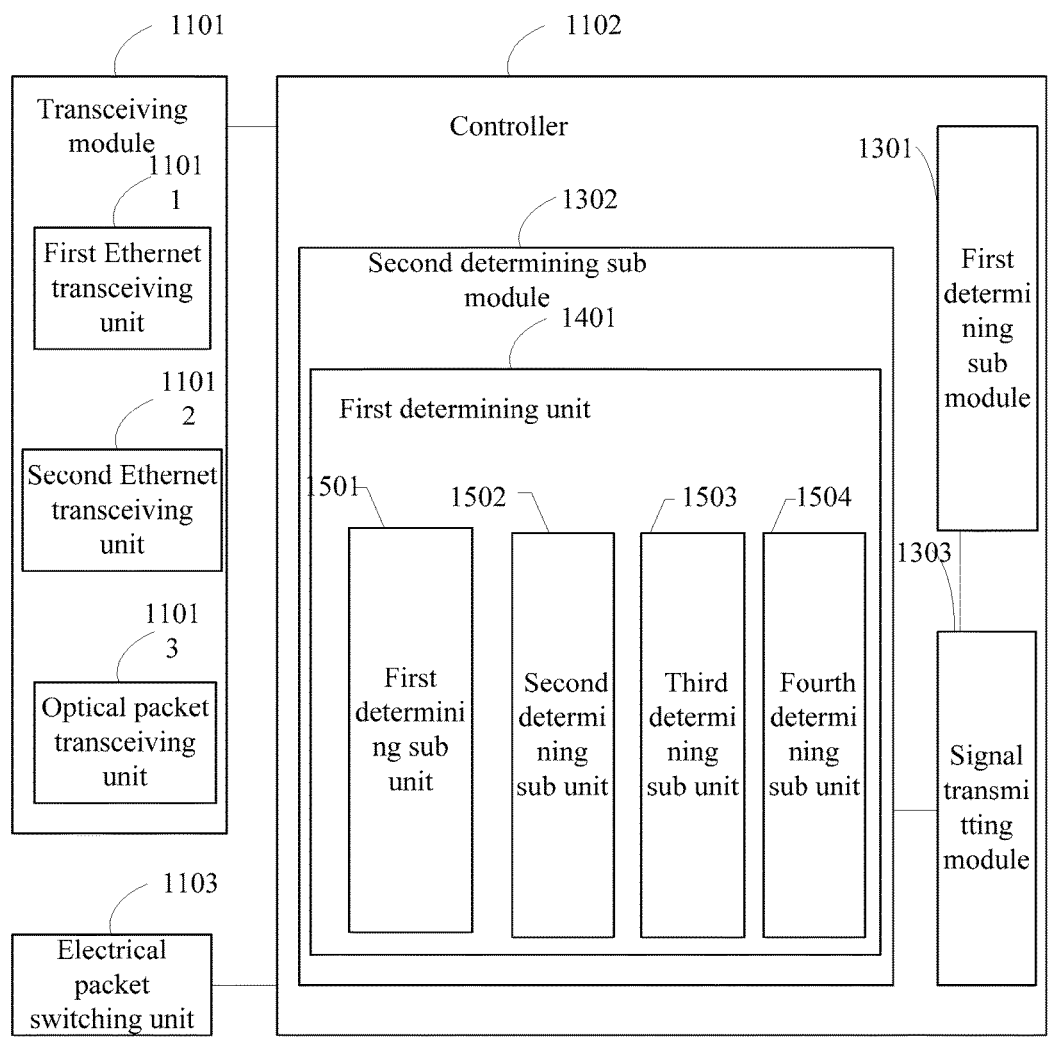
FIG. 15 is a schematic structural diagram of an access switch according to another embodiment of the present invention.

The first determining unit 1401 illustrated in FIG. 14 includes a first determining sub unit 1501, a second determining sub unit 1502, a third determining sub unit 1503 and/or a fourth determining sub unit 1504, FIG. 15 is a schematic structural diagram of an access switch according to another embodiment of the present invention, where:

the first determining sub unit 1501 is configured to, if the MAC frame is not from a downlink interface and the destination MAC address of the MAC frame is a broadcast address or a multicast address, or if the MAC frame is not from a downlink interface and the destination MAC address of the MAC frame is not a broadcast address or a multicast address and the electrical packet switching network forwarding interface information corresponding to the destination MAC address of the MAC frame is not found in the MAC address forwarding table, then determine the downlink interface of the present broadcast domain to be used for broadcasting the MAC frame, at this time, the signal transmitting module 1303 is configured to, if the first determining sub unit 1501 determines the downlink interface of the present broadcast domain to be used for broadcasting the MAC frame, transmit the control signal to the electrical packet switching unit, so that the MAC frame is broadcasted to the downlink interface of the present broadcast domain;

the second determining sub unit 1502 is configured to, if the MAC frame is from a downlink interface and the destination MAC address of the MAC frame is a broadcast address or a multicast address, then determine the downlink interface and the uplink electrical packet switching network interface of the present broadcast domain to be used for broadcasting the MAC frame, at this time, the signal transmitting module 1303 is configured to, if the second determining sub unit 1502 determines the downlink interface and the uplink electrical packet switching network interface of the present broadcast domain to be used for broadcasting the MAC frame, transmit the control signal to the electrical packet switching unit, so that the MAC frame is broadcasted to the downlink interface and the uplink electrical packet switching network interface of the present broadcast domain;

the third determining sub unit 1503 is configured to, if the MAC frame is from a downlink interface and the destination MAC address of the MAC frame is not a broadcast address or a multicast address, and the table entry corresponding to the destination MAC address of the MAC frame is not found in the MAC address forwarding table, then determine the downlink interface and the uplink electrical packet switching network interface of the present broadcast domain to be used for broadcasting the MAC frame, at this time, the signal transmitting module 1303 is configured to, if the third determining sub unit 1503 determines the downlink interface and the uplink electrical packet switching network interface of the present broadcast domain to be used for broadcasting the MAC frame, transmit the control signal to the electrical packet switching unit, so that the MAC frame is broadcasted to the downlink interface and the uplink electrical packet switching network interface of the present broadcast domain;

the fourth determining sub unit 1504 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame, at this time, the signal transmitting module 1303 is configured to, if the fourth determining sub unit 1504 determines the uplink electrical packet switching network interface of the present broadcast domain to be used for broadcasting the MAC frame, transmit the control signal to the electrical packet switching unit, so that the MAC frame is broadcasted to the uplink electrical packet switching network interface of the present broadcast domain.

Figure 16:
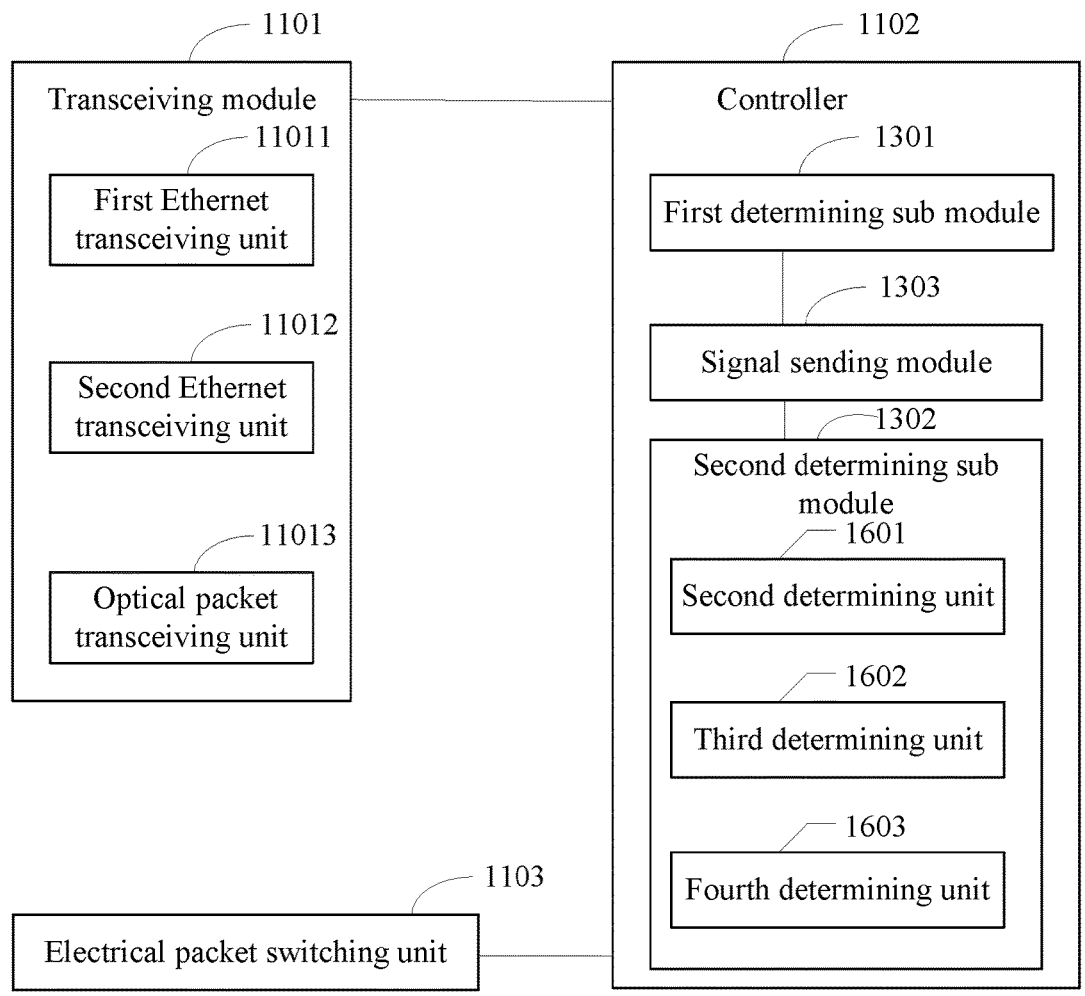
FIG. 16 is a schematic structural diagram of an access switch according to another embodiment of the present invention.

The second determining sub module 1302 illustrated in FIG. 13 includes a second determining unit 1601, a third determining unit 1602 and/or a fourth determining unit 1603, FIG. 16 is a schematic structural diagram of an access switch according to another embodiment of the present invention, where:

the second determining unit 1601 is configured to, if the MAC frame is not from a downlink interface, and the destination MAC address of the MAC frame is not a broadcast address or a multicast address, and electrical packet switching network forwarding interface information corresponding to the destination MAC address of the MAC frame is found in the MAC address forwarding table, then determine the downlink interface corresponding to the destination MAC address of the MAC frame to be used for switching the MAC frame, at this time, the signal transmitting module 1303 is configured to, if the second determining unit 1601 determines the downlink interface corresponding to the destination MAC address of the MAC frame to be used for switching the MAC frame, transmit the control signal to the electrical packet switching unit, so that the MAC frame is switched to the downlink interface corresponding to the destination MAC address of the MAC frame;

the third determining unit 1602 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determine the downlink interface or the uplink electrical packet switching network interface corresponding to the destination MAC address of the MAC frame to be used for switching the MAC frame, at this time, the signal transmitting module 1303 is configured to, if the third determining unit 1602 determines the downlink interface or the uplink electrical packet switching network interface corresponding to the destination MAC address of the MAC frame to be used for switching the MAC frame, transmit the control signal to the electrical packet switching unit, so that the MAC frame is switched to the uplink electrical packet switching network interface or the downlink interface corresponding to the destination MAC address of the MAC frame;

the fourth determining unit 1603 is configured to, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame, at this time, the signal transmitting module 1303 is configured to, if the fourth determining unit 1603 determines the downlink interface or the uplink electrical packet switching network interface corresponding to the destination MAC address of the MAC frame to be used for switching the MAC frame, transmit the control signal to the electrical packet switching unit, so that the MAC frame is switched to the downlink interface or the uplink electrical packet switching network interface corresponding to the destination MAC address of the MAC frame.

Figure 17:
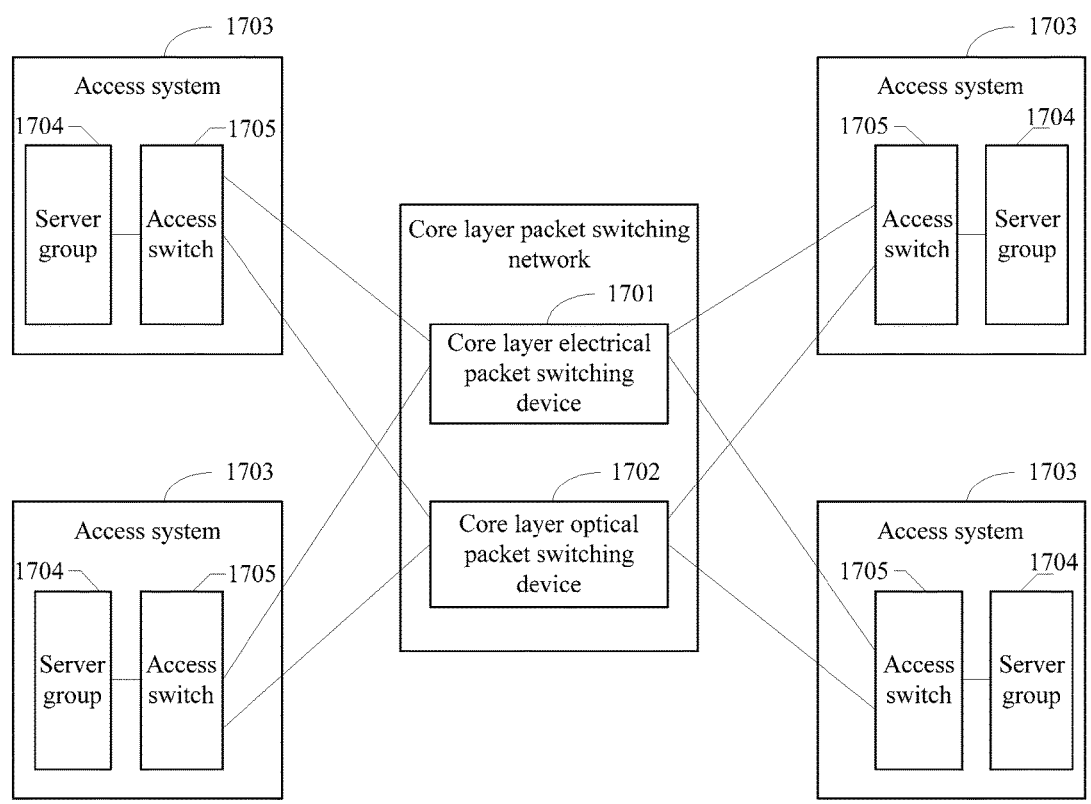
FIG. 17 is a schematic structural diagram of a system for data packet switching according to an embodiment of the present invention.

Please refer to FIG. 17, which is a schematic structural diagram of a system for data packet switching according to an embodiment of the present invention. To describe more clearly, only components relevant to the embodiment of the present invention are illustrated here. The system for data packet switching illustrated in FIG. 17 may be used in a datacenter, which includes: a core layer electrical packet switching device 1701, a core layer optical packet switching device 1702 and at least one access system 1703, where the access system 1703 includes a server group 1704 consisting of at least one server, and an access switch 1705 connecting to the server group 1704, where the core layer electrical packet switching device 1701 and the server group 1704 constitute an electrical packet switching network in the embodiment of the present invention, the core layer optical packet switching device 1702 constitutes an optical packet switching network in the embodiment of the present invention, the core layer electrical packet switching device 1701 and the core layer optical packet switching device 1702 constitute a core layer packet switching network, the access switch 1705 may be any one of the access switches illustrated in FIG. 11 to FIG. 16.

In the system for data packet switching illustrated in FIG. 17, the access switch 1705 connects to the server via a downlink interface, and connects to the core layer electrical packet switching device 1701 via an uplink electrical packet switching network interface, and connects to the core layer optical packet switching device 1702 via an uplink optical packet switching network interface; the access switch 1705 is configured to receive a Media Access Control Address (MAC) frame, extract MAC frame control information and establish a MAC address forwarding table according to the MAC frame control information, determine an interface used for forwarding the MAC frame according to the MAC frame control information and through performing a query on the MAC address forwarding table, and transmit a control signal to an electrical packet switching unit, to forward the MAC frame to the determined interface, where, the MAC frame may be from a downlink interface, an uplink electrical packet switching network interface or an uplink optical packet switching network interface, namely, the access switch 1705 may receive a MAC frame from the server group 1704, receive a MAC frame from the core layer electrical packet switching device 1701 or receive a MAC frame from the core layer optical packet switching device 1702, where, the MAC frame control information includes any one or any combination of a source MAC address, a destination MAC address, a virtual local area network identifier and frame protocol type information, the interface used for forwarding the MAC frame includes a downlink interface, an uplink electrical packet switching network interface and/or an uplink optical packet switching network interface. Specifically, the access switch 1705 receives the MAC frame from the server group 1704 via the downlink interface, extracts MAC frame control information, determines an interface used for forwarding the MAC frame, according to the MAC frame control information and by way of querying the MAC address forwarding table, and transmits a control signal to an electrical packet switching unit, to forward the MAC frame to the server group 1704 via the determined interface, the core layer electrical packet switching device 1701 and/or the core layer optical packet switching device 1702; or, the access switch 1705 receives the MAC frame from the core layer electrical packet switching device 1701 via the uplink electrical packet switching network interface, extracts MAC frame control information, determines an interface used for forwarding the MAC frame according to the MAC frame control information and through performing a query on the MAC address forwarding table, and transmits a control signal to an electrical packet switching unit, to forward the MAC frame to the server group 1704 via the determined interface; or, the access switch 1705 receives an optical packet from the core layer optical packet switching device 1702 via the uplink electrical packet switching network interface, extracts MAC frame control information, determines an interface used for forwarding the MAC frame according to the MAC frame control information and through performing a query on the MAC address forwarding table, and transmits a control signal to an electrical packet switching unit, to forward the MAC frame to the server group 1704 via the determined interface.

Figure 18:
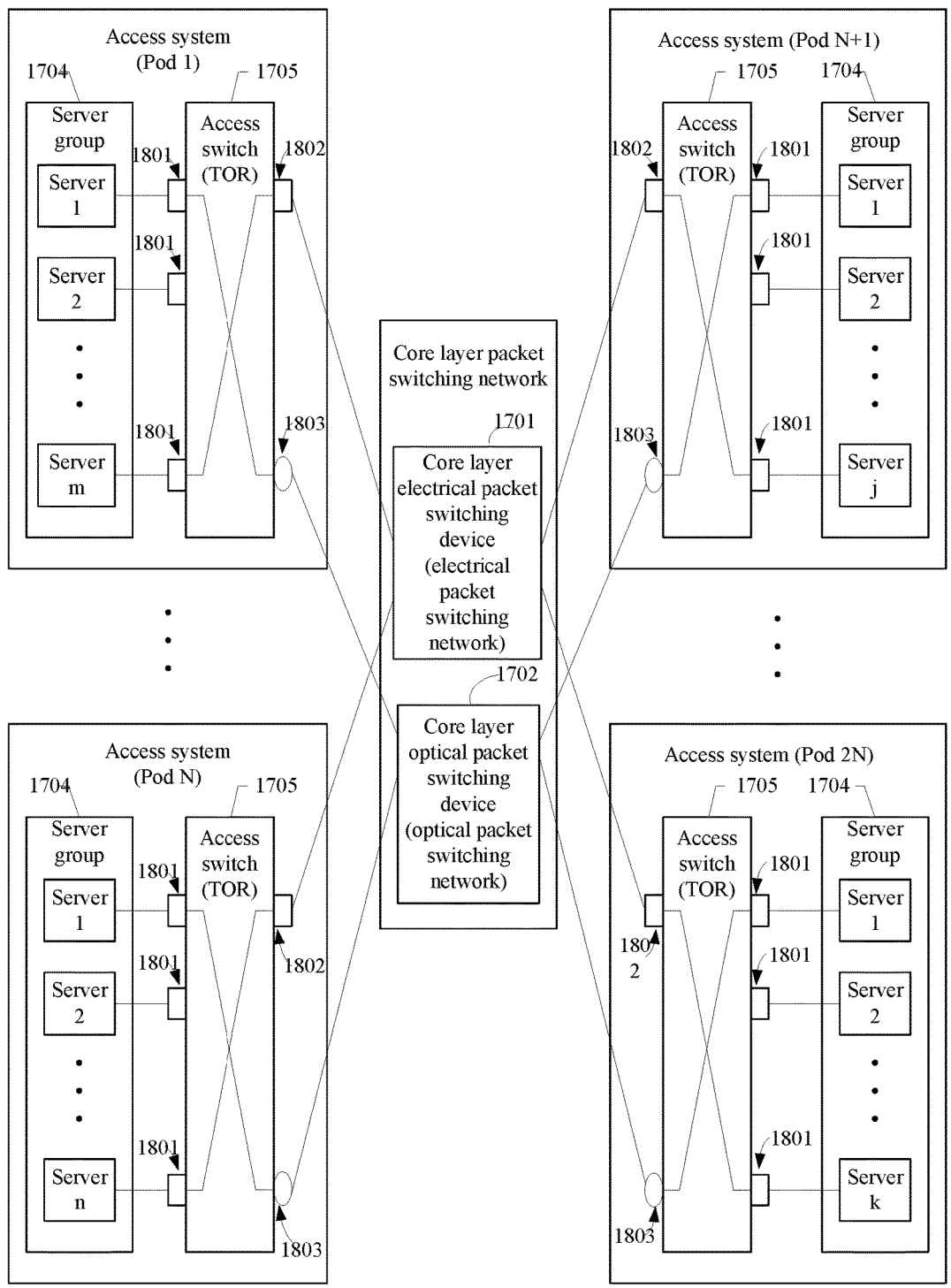
FIG. 18 is a schematic structural diagram of a system for data packet switching according to another embodiment of the present invention.

To describe the system for data packet switching illustrated in FIG. 17 more clearly, a structure of a system for data packet switching according to another embodiment of the present invention is shown in the following, as illustrated in FIG. 18. In the system for data packet switching illustrated in FIG. 18, multiple servers (normally 40 to 80) constitute the server group 1704 illustrated in FIG. 17, each server in the server group connects to a downlink interface 1801 of the access switch 1705 illustrated in FIG. 17 via a 1GE or a 10GE internet interface, and performs communications. Each server group and the connected access switch are called a rack or a pod. The access switch receives a data packet required to be switched from the server via the downlink interface 1801, and transmits the data packet of which the destination is the server in the current pod to the corresponding server. The core layer packet switching network of the datacenter network is constituted by an optical packet switching device and an electrical packet switching device, the optical packet switching network contains the core layer optical packet switching device 1702 illustrated in FIG. 17, the electrical packet switching network contains the core layer electrical packet switching device 1701 and the server group 1704 illustrated in FIG. 17. Each access switch connects to the electrical packet switching network via an uplink electrical packet switching network interface 1802, and connects to the optical packet switching network via an uplink optical packet switching network interface 1803. In this way, the access switches can not only communicate via the optical packet switching network, but can also communicate via the electrical packet switching network. Take the case where the server 1 in the pod 1 visits the server 2 in the pod N+1 as an example, the access switch 1 (TOR 1 for short) receives the data packets from the server 1 via the downlink interface, where the receiving is accomplished by the transceiving module in the TOR 1, then the TOR 1 parses out a MAC frame, and performs a query on a MAC address forwarding table provided in the embodiment of the present invention according to information such as a destination MAC address and a VLAN ID carried in the MAC frame and the method for data packet switching illustrated in FIG. 4, determines to switch the data packet to the uplink electrical packet switching network interface 1802 or the uplink optical packet switching network interface 1803. The transceiving module, which connects to the electrical packet switching network via the uplink electrical packet switching network interface 1802, or connects to the optical packet switching network via the uplink optical packet switching network interface 1803, encapsulates the MAC frame into a packet which can be transmitted on a link, and then delivers to the electrical packet switching network or the optical packet switching network for switching. The data packet arrives at the access switch N+1 (TOR N+1 for short) after being switched by the electrical packet switching network or the optical packet switching network, after the uplink electrical packet switching network interface 1802 or the uplink optical packet switching network interface 1803 of the TOR N+1 receives the data packet, where the receiving of the data frame is accomplished by the transceiving module in the TOR N+1, the TOR N+1 parses out the MAC frame, and performs a query on the MAC address forwarding table provided in the embodiment of the present invention according to the destination MAC address carried in the MAC frame, and determines, according to the method for data packet switching illustrated in FIG. 4, the downlink interface 1801 to which the MAC frame needs to be forwarded, then switches the MAC frame to the corresponding downlink interface 1801, the transceiving module connecting to the server group via the downlink interface 1801 processes the MAC frame into an Ethernet data frame and transmits the frame to the server 2 in the pod N+1, then the switching is accomplished.

It should be noted that, since contents such as information switching and executing processes among modules/units in the aforementioned apparatus are based on the same conception as the method embodiments of the present invention, technical effects thereof are as same as those of the method embodiments of the present invention, please refer to the description in the method embodiments of the present invention for specific content, the details are not repeated herein.

Persons of ordinary skill in the art may understand that all or part of the steps in the methods of the aforementioned embodiments may be implemented by a program instructing relevant hardware, such as one or more or all of the following methods:

the first method: receive Media Access Control Address (MAC) frame control information, where the MAC frame control information includes any one or any combination of a destination MAC address, a virtual local area network identifier and frame protocol type information; determine an interface used for forwarding an MAC frame according to the MAC frame control information and by way of querying a MAC address forwarding table, where the interface used for forwarding the MAC frame includes a downlink interface, an uplink electrical packet switching network interface and/or an uplink optical packet switching network interface; transmit a control signal to an electrical packet switching unit, so that the MAC frame is forwarded to the determined interface.

The second method: extract MAC frame control information from a received Media Access Control Address (MAC) frame, and establish a MAC address forwarding table according to the MAC frame control information, where the MAC frame control information includes any one or any combination of a source MAC address, a destination MAC address, a virtual local area network identification and frame protocol type information; receive the MAC frame control information, determine an interface used for forwarding an MAC frame according to the MAC frame control information and through performing a query on a MAC address forwarding table, and transmit a control signal to an electrical packet switching unit, where the interface used for forwarding the MAC frame includes a downlink interface, an uplink electrical packet switching network interface and/or an uplink optical packet switching network interface; the electrical packet switching unit forwards the MAC frame to the determined interface.

Persons of ordinary skill in the art may understand that all or part of the steps in the above method embodiments may be implemented by a program instructing relevant hardware.

The program may be stored in a computer readable storage medium. The storage medium may include a Read Only Memory (ROM), a Random Access Memory (RAM), a magnetic disk, or an optical disk.

The apparatuses and methods for data packet switching, the access switches and the switching systems according to embodiments of the present invention are described in detail in the above. The principle and the implementations are described through some exemplary embodiments, descriptions of the aforementioned embodiments are merely used for understanding the method and the core idea of the present invention; in the meantime, it is apparent that those skilled in the art can make modifications and variations to the invention based on the idea of the present invention, therefore, the description should not be interpreted as a limitation to the present invention.

What is claimed is:

1. A method for data packet switching, comprising:
receiving, by a controller in an access switch, Media Access Control Address (MAC) frame control information, wherein the MAC frame control information comprises one or any combination of a destination MAC address, a virtual local area network identifier and frame protocol type information;
making, by the controller, judgments according to the MAC frame control information and through performing a query on a MAC address forwarding table, determining, by the controller, an interface used for forwarding an MAC frame based on the judgment results, wherein the interface used for forwarding the MAC frame comprises a downlink interface, an uplink electrical packet switching network interface and/or an uplink optical packet switching network interface; and
transmitting, by the controller, a control signal to a processor in the access switch, so that the MAC frame is forwarded to the determined interface;
wherein the making, by the controller, the judgments according to the MAC frame control information and through performing the query on the MAC address forwarding table comprises:
judging, by the controller, whether the MAC frame is received via a downlink interface;
judging, by the controller, whether a destination MAC address of the MAC frame is a broadcast address or a multicast address;
performing, by the controller, a query on the MAC address forwarding table, and determining, by the controller, whether a table entry corresponding to the destination MAC address of the MAC frame is found in the MAC address forwarding table;
judging, by the controller, whether optical packet switching network forwarding interface information in the MAC address forwarding table is NULL;
judging, by the controller, whether the MAC frame is a protocol frame according to the frame protocol type information of the MAC frame;
judging, by the controller, whether an output cache which corresponds to an uplink optical packet switching network interface corresponding to the destination MAC address of the MAC frame is overflowed.

2. The method according to claim 1, wherein the determining, by the controller, the interface used for forwarding the MAC frame based on the judgment results comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information in the MAC address forwarding table is not NULL, and it is judged that the MAC frame is not a protocol frame according to the control information, and the output cache which corresponds to the uplink optical packet switching network interface corresponding to the destination MAC address of the MAC frame is not overflowed, then determining, by the controller, the uplink optical packet switching network interface corresponding to the destination MAC address of the MAC frame to be used for forwarding the MAC frame, otherwise, determining, by the controller, the downlink interface and/or the uplink electrical packet switching network interface to be used for forwarding the MAC frame;

if the uplink optical packet switching network interface corresponding to the destination MAC address of the MAC frame is determined to be used for switching the MAC frame, then the transmitting, by the controller, the control signal to the processor, so that the MAC frame is forwarded to the determined interface comprises: transmitting, by the controller, the control signal to the processor, so that the MAC frame is switched to the uplink optical packet switching network interface corresponding to the destination MAC address of the MAC frame.

3. The method according to claim 2, wherein the making, by the controller, the judgments according to the MAC frame control information and through performing the query on the MAC address forwarding table further comprises:

judging, by the controller, whether electrical packet switching network forwarding interface information corresponding to the destination MAC address of the MAC frame in the MAC address forwarding table is NULL;

performing, by the controller, a query on the MAC address forwarding table, and determining whether the electrical packet switching network forwarding interface information corresponding to the destination MAC address of the MAC frame is found in the MAC address forwarding table;

wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, then determining, by the controller, a downlink interface and/or an uplink electrical packet switching network interface of a present broadcast domain to be used for broadcasting the MAC frame; and if the downlink interface and/or the uplink electrical packet switching network interface of the present broadcast domain is determined to be used for broadcasting the MAC frame, then the transmitting, by the controller, the control signal to the processor, so that the MAC frame is forwarded to the determined interface comprises: transmitting, by the controller, the control signal to the processor, so that the MAC frame is broadcasted to the downlink interface and/or the uplink electrical packet switching network interface of the present broadcast domain.

4. The method according to claim 3, wherein the if the MAC frame is not from a downlink interface, then determining, by the controller, the downlink interface and/or the uplink electrical packet switching network interface of the present broadcast domain to be used for broadcasting the MAC frame comprises: if the destination MAC address of the MAC frame is a broadcast address or a multicast address, or if the destination MAC address of the MAC frame is not a broadcast address or a multicast address and the electrical packet switching network forwarding interface information corresponding to the destination MAC address of the MAC frame is not found in the MAC address forwarding table, then determining, by the controller, the downlink interface of the present broadcast domain to be used for broadcasting the MAC frame, if the downlink interface of the present broadcast domain is determined to be used for broadcasting the MAC frame, then the transmitting, by the controller, the control signal to the processor, so that the MAC frame is forwarded to the determined interface comprises: transmitting, by the controller, the control signal to the processor, so that the MAC frame is broadcasted to the downlink interface of the present broadcast domain;

wherein the if the destination MAC address of the MAC frame is a broadcast address or a multicast address, then determining, by the controller, the downlink interface and/or the uplink electrical packet switching network interface of the present broadcast domain to be used for broadcasting the MAC frame comprises: if the MAC frame is from a downlink interface, then determining, by the controller, the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, then the transmitting, by the controller, the control signal to the processor, so that the MAC frame is forwarded to the determined interface comprises: transmitting, by the controller, the control signal to the processor, so that the MAC frame is broadcasted to the downlink interface and the uplink electrical packet switching network interface of the present broadcast domain;

wherein the if the table entry corresponding to the destination MAC address of the MAC frame is not found in the MAC address forwarding table, then determining, by the controller, the downlink interface and/or the uplink electrical packet switching network interface of the present broadcast domain to be used for broadcasting the MAC frame comprises: if the MAC frame is from a downlink interface and the destination MAC address of the MAC frame is not a broadcast address or a multicast address, then determining, by the controller, the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, then the transmitting, by the controller, the control signal to the processor, so that the MAC frame is forwarded to the determined interface comprises: transmitting, by the controller, the control signal to the processor, so that the MAC frame is broadcasted to the downlink interface and the uplink electrical packet switching network interface of the present broadcast domain;

wherein the if the electrical packet switching network forwarding interface information corresponding to the destination MAC address of the MAC frame in the MAC address forwarding table is NULL, then determining, by the controller, the downlink interface and/or the uplink electrical packet switching network interface of the present broadcast domain to be used for broadcasting the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the electrical packet switching network forwarding interface information corresponding to the destination MAC address of the MAC frame in the MAC address forwarding table is NULL, then determining, by the controller, the uplink electrical packet switching network interface of the present broadcast domain to be used for broadcasting the MAC frame, if the uplink electrical packet switching network interface of the present broadcast domain is determined to be used for broadcasting the MAC frame, then the transmitting, by the controller, the control signal to the processor, so that the MAC frame is forwarded to the determined interface comprises: transmitting, by the controller, the control signal to the processor, so that the MAC frame is broadcasted to the uplink electrical packet switching network interface of the present broadcast domain.

5. The method according to claim 2, wherein the making, by the controller, the judgments according to the MAC frame control information and through performing the query on the MAC address forwarding table further comprises: performing, by the controller, a query on the MAC address forwarding table, and determining whether the electrical packet switching network forwarding interface information corresponding to the destination MAC address of the MAC frame is found in the MAC address forwarding table; wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is not from a downlink interface, and the destination MAC address of the MAC frame is not a broadcast address or a multicast address, and the electrical packet switching network forwarding interface information corresponding to the destination MAC address of the MAC frame is found in the MAC address forwarding table, then determining, by the controller, the downlink interface corresponding to the destination MAC address of the MAC frame to be used for switching the MAC frame, if the downlink interface corresponding to the destination MAC address of the MAC frame is determined to be used for switching the MAC frame, then the transmitting, by the controller, the control signal to the processor, so that the MAC frame is forwarded to the determined interface comprises: transmitting, by the controller, the control signal to the processor, so that the MAC frame is switched to the downlink interface corresponding to the destination MAC address of the MAC frame; or wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determining, by the controller, the uplink electrical packet switching network interface or the downlink interface corresponding to the destination MAC address of the MAC frame to be used for switching the MAC frame, if the uplink electrical packet switching network interface or the downlink interface corresponding to the destination MAC address of the MAC frame is determined to be used for switching the MAC frame, then the transmitting, by the controller, the control signal to the processor, so that the MAC frame is forwarded to the determined interface comprises: transmitting, by the controller, the control signal to the processor, so that the MAC frame is switched to the uplink electrical packet switching network interface or the downlink interface corresponding to the destination MAC address of the MAC frame; or wherein the making, by the controller, the judgments according to the MAC frame control information and through performing the query on the MAC address forwarding table further comprises: judging, by the controller, whether the electrical packet switching network forwarding interface information corresponding to the destination MAC address of the MAC frame in the MAC address forwarding table is NULL; wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determining, by the controller, the downlink interface or the uplink electrical packet switching network interface corresponding to the destination MAC address of the MAC frame to be used for switching the MAC frame, if the downlink interface or the uplink electrical packet switching network interface corresponding to the destination MAC address of the MAC frame is determined to be used for switching the MAC frame, then the transmitting, by the controller, the control signal to the processor, so that the MAC frame is forwarded to the determined interface comprises: transmitting, by the controller, the control signal to the processor, so that the MAC frame is switched to the downlink interface or the uplink electrical packet switching network interface corresponding to the destination MAC address of the MAC frame.

6. A method for data packet switching, comprising:
extracting, by a processor in an access switch, Media Access Control Address (MAC) frame control information from a received MAC frame, and establishing, by the processor, a MAC address forwarding table according to the MAC frame control information, wherein the MAC frame control information comprises one or any combination of a source MAC address, a destination MAC address, a virtual local area network identifier and frame protocol type information;
receiving, by a controller in the access switch, the MAC frame control information, making, by the controller, judgments according to the MAC frame control information and through performing a query on a MAC address forwarding table, determining, by the controller, an interface used for forwarding the MAC frame based on the judgment results, and transmitting, by the controller, a control signal to the processor, wherein the interface used for forwarding the MAC frame comprises a downlink interface, an uplink electrical packet switching network interface and/or an uplink optical packet switching network interface; and
forwarding, by the processor, the MAC frame to the determined interface;
wherein the establishing, by the processor, the MAC address forwarding table according to the MAC frame control information comprises:
if a table entry corresponding to the source MAC address does not exist in the MAC address forwarding table, then establishing, by the processor, the table entry corresponding to the source MAC address, wherein the establishing, by the processor, the table entry comprises: setting, by the processor, electrical packet switching network forwarding interface information or optical packet switching network forwarding interface information to be an electrical packet switching network interface or an uplink optical packet switching network interface on which the MAC frame is received, wherein the electrical packet switching network interface comprises an uplink electrical packet switching network interface and a downlink interface; if a table entry corresponding to the source MAC address exists in the MAC address forwarding table, then updating, by the processor, electrical packet switching network forwarding interface information or optical packet switching network forwarding interface information, which is already comprised in the table entry corresponding to the source MAC address, to be an electrical packet switching network interface or an uplink optical packet switching network interface on which the MAC frame is received;
wherein the making, by the controller, the judgments according to the MAC frame control information and through performing the query on the MAC address forwarding table comprises:
judging, by the controller, whether the MAC frame is received via a downlink interface; judging, by the controller, whether a destination MAC address of the MAC frame is a broadcast address or a multicast address; performing, by the controller, a query on the MAC address forwarding table, and determining, by the controller, whether a table entry corresponding to the destination MAC address of the MAC frame is found in the MAC address forwarding table; judging, by the controller, whether optical packet switching network forwarding interface information in the MAC address forwarding table is NULL; judging, by the controller, whether the MAC frame is a protocol frame according to the frame protocol type information of the MAC frame; judging, by the controller, whether an output cache which corresponds to an uplink optical packet switching network interface corresponding to the destination MAC address of the MAC frame is overflowed.

7. The method according to claim 6, wherein the determining, by the controller, the interface used for forwarding the MAC frame based on the judgment results comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information in the MAC address forwarding table is not NULL, and it is judged that the MAC frame is not a protocol frame according to the control information, and the output cache which corresponds to the uplink optical packet switching network interface corresponding to the destination MAC address of the MAC frame is not overflowed, then determining, by the controller, the uplink optical packet switching network interface corresponding to the destination MAC address of the MAC frame to be used for switching the MAC frame, otherwise, determining, by the controller, the downlink interface and/or the uplink electrical packet switching network interface to be used for forwarding the MAC frame;
    if the uplink optical packet switching network interface corresponding to the destination MAC address of the MAC frame is determined to be used for switching the MAC frame, then the transmitting, by the controller, the control signal to the controller, so that the MAC frame is forwarded to the determined interface comprises: transmitting, by the controller, the control signal to the controller, so that the MAC frame is switched to the uplink optical packet switching network interface corresponding to the destination MAC address of the MAC frame.

8. The method according to claim 7, wherein the making, by the controller, the judgments according to the MAC frame control information and through performing the query on the MAC address forwarding table further comprises:
    judging, by the controller, whether electrical packet switching network forwarding interface information corresponding to the destination MAC address of the MAC frame in the MAC address forwarding table is NULL;
    performing, by the controller, a query on the MAC address forwarding table, and determining whether the electrical packet switching network forwarding interface information corresponding to the destination MAC address of the MAC frame is found in the MAC address forwarding table;
    wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, a downlink interface and/or the uplink electrical packet switching network interface to be used for forwarding the MAC frame comprises: if the destination MAC address of the MAC frame is a broadcast address or a multicast address, or the table entry corresponding to the destination MAC address of the MAC frame is not found in the MAC address forwarding table, or the electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, then determining, by the controller, a downlink interface and/or an uplink electrical packet switching network interface of a present broadcast domain to be used for broadcasting the MAC frame; and
    if the downlink interface and/or the uplink electrical packet switching network interface of the present broadcast domain is determined to be used for broadcasting the MAC frame, then the transmitting, by the controller, the control signal to the controller, so that the MAC frame is forwarded to the determined interface comprises: transmitting, by the controller, the control signal to the controller, so that the MAC frame is broadcasted to the downlink interface and/or the uplink electrical packet switching network interface of the present broadcast domain.

9. The method according to claim 8, wherein the if the MAC frame is not from a downlink interface, then determining, by the controller, the downlink interface and/or the uplink electrical packet switching network interface of the present broadcast domain to be used for broadcasting the MAC frame comprises: if the destination MAC address of the MAC frame is a broadcast address or a multicast address, or if the destination MAC address of the MAC frame is not a broadcast address or a multicast address and the electrical packet switching network forwarding interface information corresponding to the destination MAC address of the MAC frame is found in the MAC address forwarding table, then determining, by the controller, the downlink interface of the present broadcast domain to be used for broadcasting the MAC frame, if the downlink interface of this broadcast domain is determined to be used for broadcasting the MAC frame, then the transmitting, by the controller, the control signal to the controller, so that the MAC frame is forwarded to the determined interface comprises: transmitting, by the controller, the control signal to the controller, so that the MAC frame is broadcasted to the downlink interface of the present broadcast domain;
    wherein the if the destination MAC address of the MAC frame is a broadcast address or a multicast address, then determining, by the controller, the downlink interface and/or the uplink electrical packet switching network interface of the present broadcast domain to be used for broadcasting the MAC frame comprises: if the MAC frame is from a downlink interface, then determining, by the controller, the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, then the transmitting, by the controller, the control signal to the controller, so that the MAC frame is forwarded to the determined interface comprises: transmitting, by the controller, the control signal to the controller, so that the MAC frame is broadcasted to the downlink interface and the uplink electrical packet switching network interface of the present broadcast domain;
    wherein the if the table entry corresponding to the destination MAC address of the MAC frame is not found in the MAC address forwarding table, then determining, by the controller, the downlink interface and/or the uplink electrical packet switching network interface of the present broadcast domain to be used for broadcasting the MAC frame comprises: if the MAC frame is from a downlink interface and the destination MAC address of the MAC frame is not a broadcast address or a multicast address, then determining, by the controller, the downlink interface and the uplink electrical packet switching network interface of the present broadcast domain to be used for broadcasting the MAC frame, if the downlink interface and the uplink electrical packet switching network interface of the present broadcast domain are determined to be used for broadcasting the MAC frame, then the transmitting, by the controller, the control signal to the controller, so that the MAC frame is forwarded to the determined interface comprises: transmitting, by the controller, the control signal to the controller, so that the MAC frame is broadcasted to the downlink interface and the uplink electrical packet switching network interface of the present broadcast domain;

wherein the if the electrical packet switching network forwarding interface information corresponding to the destination MAC address of the MAC frame in the MAC address forwarding table is NULL, then determining, by the controller, the downlink interface and/or the uplink electrical packet switching network interface of the present broadcast domain to be used for broadcasting the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the electrical packet switching network forwarding interface information corresponding to the destination MAC address of the MAC frame in the MAC address forwarding table is NULL, then determining, by the controller, the uplink electrical packet switching network interface of this broadcast domain to be used for broadcasting the MAC frame, if the uplink electrical packet switching network interface of this broadcast domain is determined to be used for broadcasting the MAC frame, then the transmitting, by the controller, the control signal to the controller, so that the MAC frame is forwarded to the determined interface comprises: transmitting, by the controller, the control signal to the controller, so that the MAC frame is broadcasted to the uplink electrical packet switching network interface of the present broadcast domain.

10. The method according to claim 7, wherein the making, by the controller, the judgments according to the MAC frame control information and through performing the query on the MAC address forwarding table further comprises: performing, by the controller, a query on the MAC address forwarding table, and determining whether the electrical packet switching network forwarding interface information corresponding to the destination MAC address of the MAC frame is found in the MAC address forwarding table;

wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is not from a downlink interface, and the destination MAC address of the MAC frame is not a broadcast address or a multicast address, and the electrical packet switching network forwarding interface information corresponding to the destination MAC address of the MAC frame is found in the MAC address forwarding table, then determining, by the controller, the downlink interface corresponding to the destination MAC address of the MAC frame to be used for switching the MAC frame, if the downlink interface corresponding to the destination MAC address of the MAC frame is determined to be used for switching the MAC frame, then the transmitting, by the controller, the control signal to the controller, so that the MAC frame is forwarded to the determined interface comprises: transmitting, by the controller, the control signal to the controller, so that the MAC frame is switched out to the downlink interface corresponding to the destination MAC address of the MAC frame; or wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determining, by the controller, the downlink interface or the uplink electrical packet switching network interface corresponding to the destination MAC address of the MAC frame to be used for switching the MAC frame, if the downlink interface or the uplink electrical packet switching network interface corresponding to the destination MAC address of the MAC frame is determined to be used for switching the MAC frame, then the transmitting, by the controller, the control signal to the controller, so that the MAC frame is forwarded to the determined interface comprises: transmitting, by the controller, the control signal to the controller, so that the MAC frame is switched to the uplink electrical packet switching network interface or the downlink interface corresponding to the destination MAC address of the MAC frame; or wherein the making, by the controller, the judgments according to the MAC frame control information and through performing the query on the MAC address forwarding table further comprises: judging, by the controller, whether the electrical packet switching network forwarding interface information corresponding to the destination MAC address of the MAC frame in the MAC address forwarding table is NULL; wherein the if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is NULL, or it is judged that the MAC frame is a protocol frame according to the control information, or the output cache which corresponds to the uplink optical packet switching network interface corresponding to the destination MAC address of the MAC frame is overflowed, then determining, by the controller, the downlink interface and/or the uplink electrical packet switching network interface to be used for forwarding the MAC frame comprises: if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determining, by the controller, the downlink interface or the uplink electrical packet switching network interface corresponding to the destination MAC address of the MAC frame to be used for switching the MAC frame, if the downlink interface or the uplink electrical packet switching network interface corresponding to the destination MAC address of the MAC frame is determined to be used for switching the MAC frame, then the transmitting, by the controller, the control signal to the controller, so that the MAC frame is forwarded to the determined interface comprises: transmitting, by the controller, the control signal to the controller, so that the MAC frame is switched to the downlink interface or the uplink electrical packet switching network interface corresponding to the destination MAC address of the MAC frame.

11. An access switch, comprising:
a processor, configured to extract Media Access Control Address (MAC) frame control information from a received MAC frame, and establish a MAC address forwarding table according to the control information, wherein the MAC frame control information comprises one or any combination of a source MAC address, a destination MAC address, a virtual local area network identifier and frame protocol type information; and
a controller coupled to the processor, configured to receive the MAC frame control information, make judgments according to the MAC frame control information and through performing a query on the MAC address forwarding table, determine an interface used for forwarding the MAC frame based on the judgment results, transmit a control signal to the processor, wherein the interface used for forwarding the MAC frame comprises a downlink interface, an uplink electrical packet switching network interface and/or an uplink optical packet switching network interface;
wherein the processor is further configured to: forward the MAC frame to the determined interface; and
if a table entry corresponding to the source MAC address does not exist in the MAC address forwarding table, then establish the table entry corresponding to the source MAC address, wherein the establishing the table entry comprises: setting electrical packet switching network forwarding interface information or optical packet switching network forwarding interface information to be an electrical packet switching network interface or an uplink optical packet switching network interface on which the MAC frame is received, wherein the electrical packet switching network interface comprises an uplink electrical packet switching network interface and a downlink interface; and if a table entry corresponding to the source MAC address exists in the MAC address forwarding table then update the electrical packet switching network forwarding interface information or the optical packet switching network forwarding interface information, which is already comprised in the table entry corresponding to the source MAC address, to be an electrical packet switching network interface or an uplink optical packet switching network interface on which the MAC frame is received; and
wherein the controller is further configured to:
judge whether the MAC frame is received via a downlink interface; judge whether a destination MAC address of the MAC frame is a broadcast address or a multicast address; perform a query on the MAC address forwarding table, and determine whether a table entry corresponding to the destination MAC address of the MAC frame is found in the MAC address forwarding table; judge whether optical packet switching network forwarding interface information in the MAC address forwarding table is NULL; judge whether the MAC frame is a protocol frame according to the frame protocol type information of the MAC frame; judge whether an output cache which corresponds to an uplink optical packet switching network interface corresponding to the destination MAC address of the MAC frame is overflowed.

12. The access switch according to claim 11, wherein the controller is further configured to:
if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information in the MAC address forwarding table is not NULL, and it is judged that the MAC frame is not a protocol frame according to the control information, and the output cache which corresponds to the uplink optical packet switching network interface corresponding to the destination MAC address of the MAC frame is not overflowed, then determine the uplink optical packet switching network interface corresponding to the destination MAC address of the MAC frame to be used for switching the MAC frame;

if the MAC frame is not from a downlink interface, or the destination MAC address of the MAC frame is a broadcast address or a multicast address, or the table entry corresponding to the destination MAC address of the MAC frame is not found in the MAC address forwarding table, or the optical packet switching network forwarding interface information in the MAC address forwarding table is not NULL, or it is judged that the MAC frame is a protocol frame according to the control information, or the output cache which corresponds to the uplink optical packet switching network interface corresponding to the destination MAC address of the MAC frame is overflowed, determine the downlink interface and/or the uplink electrical packet switching network interface to be used for forwarding the MAC frame;

if the controller determines the uplink optical packet switching network interface corresponding to the destination MAC address of the MAC frame to be used for switching the MAC frame, transmit the control signal to the processor, so that the MAC frame is switched to the uplink optical packet switching network interface corresponding to the destination MAC address of the MAC frame.

13. The access switch according to claim 12, wherein the controller is further configured to: judge whether electrical packet switching network forwarding interface information corresponding to the destination MAC address of the MAC frame in the MAC address forwarding table is NULL; perform a query on the MAC address forwarding table, and determining whether the electrical packet switching network forwarding interface information corresponding to the destination MAC address of the MAC frame is found in the MAC address forwarding table;

wherein the controller is further configured to:
if the destination MAC address of the MAC frame is a broadcast address or a multicast address, or the table entry corresponding to the destination MAC address of the MAC frame is not found in the MAC address forwarding table, or electrical packet switching network forwarding interface information corresponding to the destination MAC address of the MAC frame in the MAC address forwarding table is NULL, or the electrical packet switching network forwarding interface information corresponding to the destination MAC address of the MAC frame is not found in the MAC address forwarding table, then determine a downlink interface and/or an uplink electrical packet switching network interface of a present broadcast domain to be used for broadcasting the MAC frame;

if the controller determines the downlink interface and/or the uplink electrical packet switching network interface of the present broadcast domain to be used for broadcasting the MAC frame, transmit the control signal to the processor, so that the MAC frame is broadcasted to the downlink interface and/or the uplink electrical packet switching network interface of the present broadcast domain.

14. The access switch according to claim 13, wherein the controller is further configured to:
if the MAC frame is not from a downlink interface and the destination MAC address of the MAC frame is a broadcast address or a multicast address, or if the MAC frame is not from a downlink interface and the destination MAC address of the MAC frame is not a broadcast address or a multicast address and the electrical packet switching network forwarding interface information corresponding to the destination MAC address of the MAC frame is not found in the MAC address forwarding table, then determine the downlink interface of the present broadcast domain to be used for broadcasting the MAC frame, and if the controller determines the downlink interface of the present broadcast domain to be used for broadcasting the MAC frame, transmit the control signal to the processor, so that the MAC frame is broadcasted to the downlink interface of the present broadcast domain;

if the MAC frame is from a downlink interface and the destination MAC address of the MAC frame is a broadcast address or a multicast address, then determine the downlink interface and the uplink electrical packet switching network interface of the present broadcast domain to be used for broadcasting the MAC frame, and if the controller determines the downlink interface and the uplink electrical packet switching network interface of the present broadcast domain to be used for broadcasting the MAC frame, transmit the control signal to the processor, so that the MAC frame is broadcasted to the downlink interface and the uplink electrical packet switching network interface of the present broadcast domain;

if the MAC frame is from a downlink interface and the destination MAC address of the MAC frame is not a broadcast address or a multicast address, and the table entry corresponding to the destination MAC address of the MAC frame is not found in the MAC address forwarding table, then determine the downlink interface and the uplink electrical packet switching network interface of the present broadcast domain to be used for broadcasting the MAC frame, and if the controller determines the downlink interface and the uplink electrical packet switching network interface of the present broadcast domain to be used for broadcasting the MAC frame, transmit the control signal to the processor, so that the MAC frame is broadcasted to the downlink interface and the uplink electrical packet switching network interface of the present broadcast domain;

if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is NULL, then determine the uplink electrical packet switching network interface of the present broadcast domain to be used for broadcasting the MAC frame, and if the controller determines the uplink electrical packet switching network interface of the present broadcast domain to be used for broadcasting the MAC frame, transmit the control signal to the processor, so that the MAC frame is broadcasted to the uplink electrical packet switching network interface of the present broadcast domain.

15. The access switch according to claim 12, wherein the controller is further configured to: perform a query on the MAC address forwarding table, and determining whether the electrical packet switching network forwarding interface information corresponding to the destination MAC address of the MAC frame is found in the MAC address forwarding table; if the MAC frame is not from a downlink interface, and the destination MAC address of the MAC frame is not a broadcast address or a multicast address, and electrical packet switching network forwarding interface information corresponding to the destination MAC address of the MAC frame is found in the MAC address forwarding table, then determine the downlink interface corresponding to the destination MAC address of the MAC frame to be used for switching the MAC frame, and if the controller determines the downlink interface corresponding to the destination MAC address of the MAC frame to be used for switching the MAC frame, transmit the control signal to the processor, so that the MAC frame is switched to the downlink interface corresponding to the destination MAC address of the MAC frame; or, if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is NULL, then determine the downlink interface or the uplink electrical packet switching network interface corresponding to the destination MAC address of the MAC frame to be used for switching the MAC frame; and if the controller determines the downlink interface or the uplink electrical packet switching network interface corresponding to the destination MAC address of the MAC frame to be used for switching the MAC frame, transmit the control signal to the processor, so that the MAC frame is switched to the downlink interface or the uplink electrical packet switching network interface corresponding to the destination MAC address of the MAC frame; or wherein the controller is further configured to: judge whether the electrical packet switching network forwarding interface information corresponding to the destination MAC address of the MAC frame in the MAC address forwarding table is NULL; if the MAC frame is from a downlink interface, and the destination MAC address of the MAC frame is not a broadcast address or a multicast address, and the table entry corresponding to the destination MAC address of the MAC frame is found in the MAC address forwarding table, and the optical packet switching network forwarding interface information corresponding to the destination MAC address of the MAC frame in the MAC address forwarding table is not NULL, and the output cache which corresponds to the uplink optical packet switching network interface corresponding to the destination MAC address of the MAC frame is overflowed, and the electrical packet switching network forwarding interface information corresponding to the destination MAC address of the MAC frame in the MAC address forwarding table is not NULL, then determine the downlink interface or the uplink electrical packet switching network interface corresponding to the destination MAC address of the MAC frame to be used for switching the MAC frame, and if the controller determines the downlink interface or the uplink electrical packet switching network interface corresponding to the destination MAC address of the MAC frame to be used for switching the MAC frame, transmit the control signal to the processor, so that the MAC frame is switched to the downlink interface or the uplink electrical packet switching network interface corresponding to the destination MAC address of the MAC frame.

* * * * *